United States Patent [19]

Elko et al.

[11] Patent Number: 5,339,427

[45] Date of Patent: Aug. 16, 1994

[54] METHOD AND APPARATUS FOR DISTRIBUTED LOCKING OF SHARED DATA, EMPLOYING A CENTRAL COUPLING FACILITY

[75] Inventors: David A. Elko; John F. Isenberg, Jr.; Brian B. Moore, all of Poughkeepsie, N.Y.; Jimmy P. Strickland, Saratoga, Calif.; Michael D. Swanson, Poughkeepsie; George W. Wang, Yorktown Heights, both of N.Y.

[73] Assignee: International Business Machines Corporation, Armonk, N.Y.

[21] Appl. No.: 860,808

[22] Filed: Mar. 30, 1992

[51] Int. Cl.⁵ .............................................. G06F 12/14
[52] U.S. Cl. .................................... 395/725; 395/650; 364/282.1; 364/DIG. 1; 364/969.2; 364/DIG. 2
[58] Field of Search ................ 395/725, 650, 325, 425; 364/282.1, DIG. 1, 969.2, DIG. 2

[56] References Cited

U.S. PATENT DOCUMENTS

| | | | |
|---|---|---|---|
| 4,399,504 | 8/1983 | Obermarck et al. | 395/650 |
| 4,402,046 | 8/1983 | Cox et al. | 395/200 |
| 4,480,304 | 10/1984 | Carr et al. | 395/725 |
| 4,604,694 | 8/1986 | Hough | 395/650 |
| 4,716,528 | 12/1987 | Crus et al. | 395/650 |
| 4,805,106 | 2/1989 | Pfeifer | 395/425 |
| 4,984,153 | 1/1991 | Kregness et al. | 395/425 |
| 5,161,227 | 11/1992 | Dias et al. | 395/650 |
| 5,230,070 | 7/1993 | Liu | 395/425 |

OTHER PUBLICATIONS

*IBM Technical Disclosure Bulletin.* "Token Ring-Based Distributed Lock Manager". vol. 30, No. 7, Dec. 1987, pp. 263-266.
IBM Technical Disclosure Bulletin, vol. 28, No. 3, Aug. 1985.
"Shared Data Availability Across a System Failure" pp. 950, 951.
IBM Technical Disclosure Bulletin, vol. 27, No. 1A, Jun. 1984, pp. 338-342 "IMS/VS Data Sharing Enhancements (Dynamic Reconfiguration to Initial State".
IBM Technical Disclosure Bulletin-vol. 25, No. 7B, Dec. 1982, pp. 3715-3717 "IMS/VS Data Sharing Enhancements (GHT Update Delay".)

*Primary Examiner*—Allen R. MacDonald
*Assistant Examiner*—Glenn A. Auve
*Attorney, Agent, or Firm*—William B. Porter

[57] ABSTRACT

A shared coupling facility contains system lock management (SLM) means for supporting a distributed locking protocol used by a plurality of sharing lock managers each executing on a processor having access to the shared memory and to any other processors in the processor complex. A request to lock a resource shared among the lock managers is first checked against a local hash table and then, if necessary, forwarded to the system lock management means in the shared memory for synchronous or asynchronous processing. List structures are maintained in the shared coupling facility to support the protocol, and are used by the system lock management means to record data recovery status. The sharing lock managers interact with the SLM means to control/manage lock contention, waiter queueing, and compatibility processing.

17 Claims, 22 Drawing Sheets

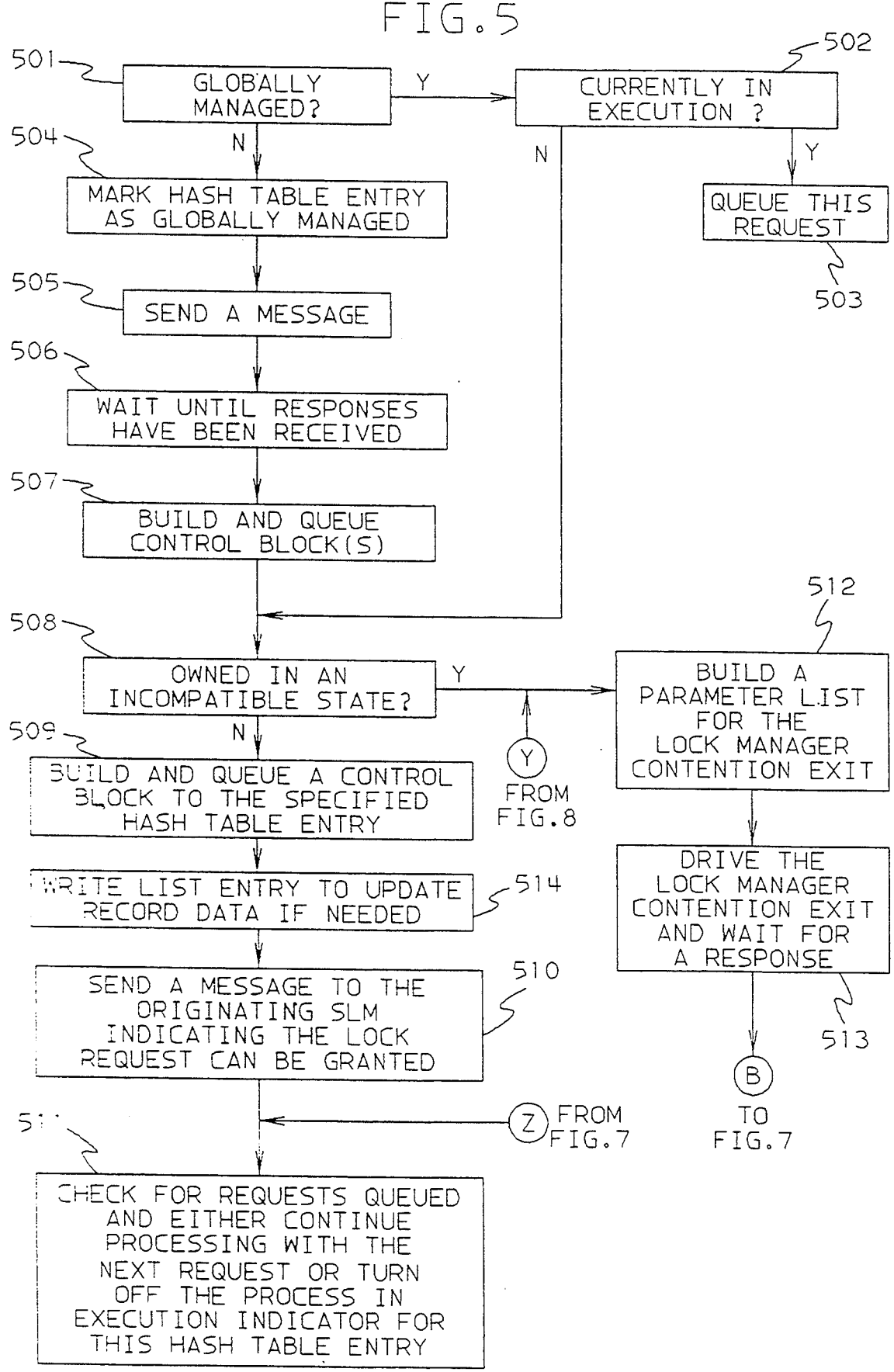

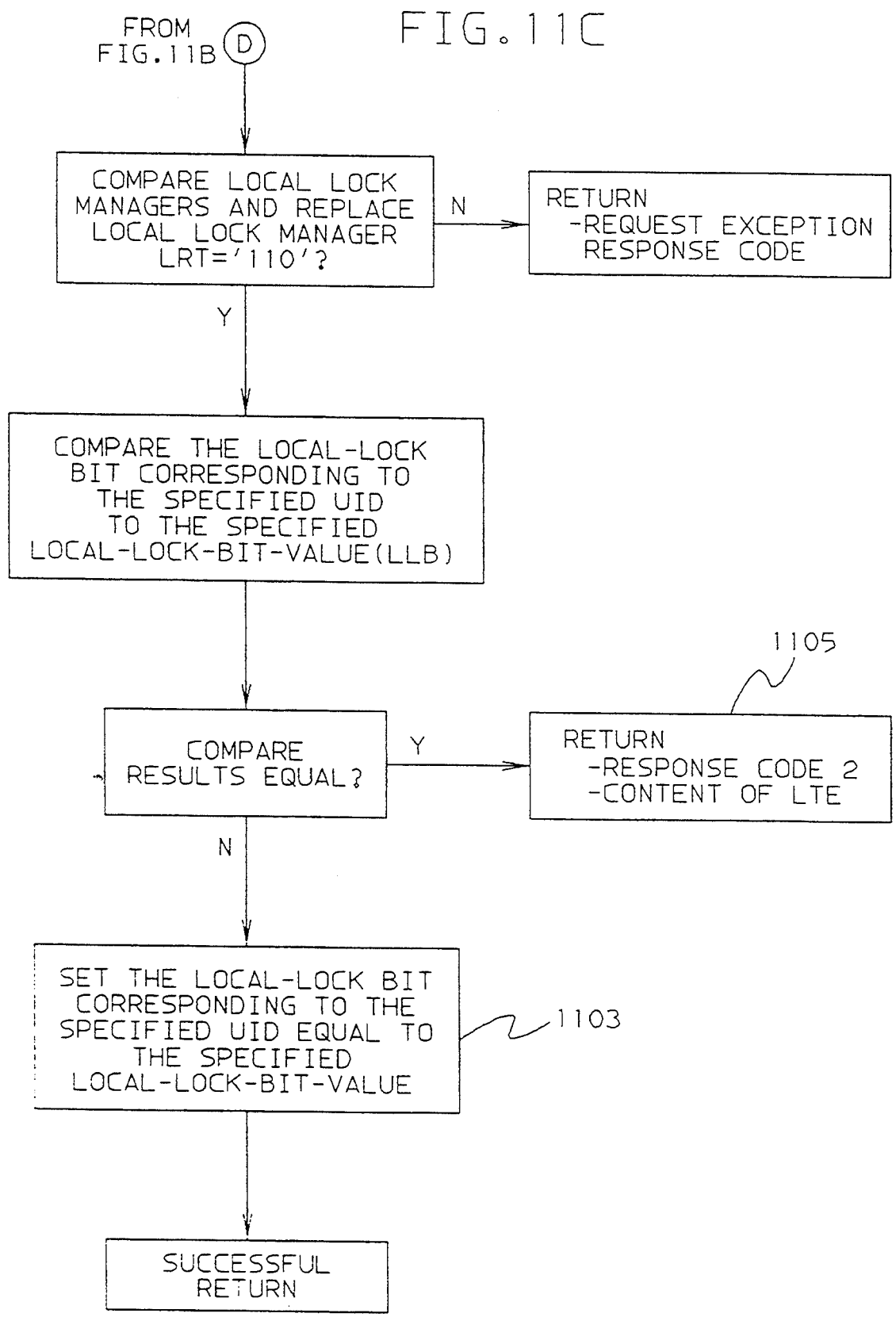

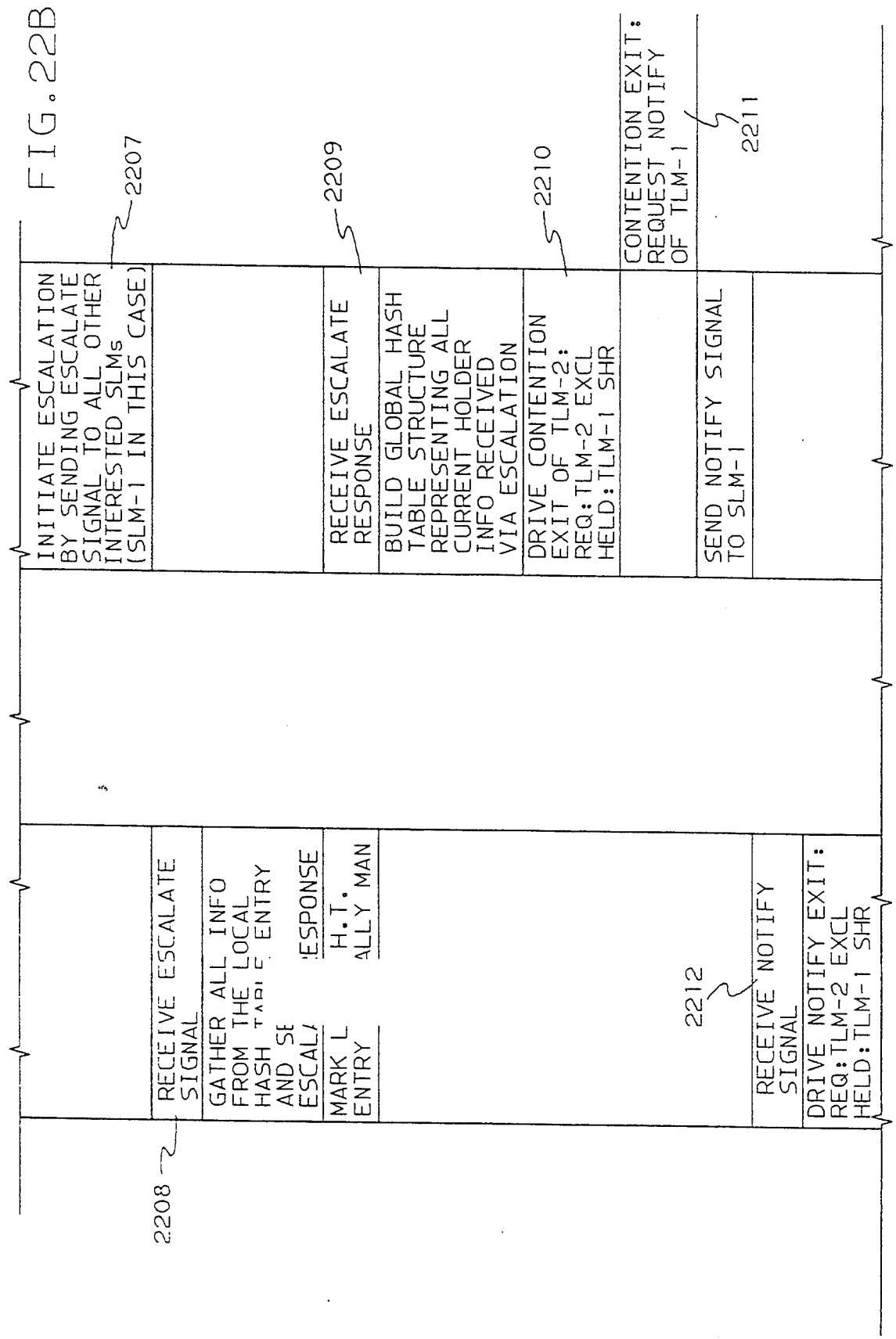

METHOD AND APPARATUS FOR DISTRIBUTED LOCKING OF SHARED DATA, EMPLOYING A CENTRAL COUPLING FACILITY

CROSS REFERENCE TO RELATED APPLICATIONS

This application contains subject matter which is related to the subject matter of the following applications which are assigned to the same assignee as this application. They are hereby incorporated by reference:

"Configurable, Recoverable Parallel Bus" by N. G. Bartow et al, Ser. No. 07/839,657, filed: Feb. 20, 1992; "High Performance Intersystem Communications For Data Processing Systems" by N G Bartow et al, Ser. No. 07/839,652, filed: Feb. 20, 1992; and "Frame-Group Transmission And, Reception For Parallel/Serial Buses", Ser. No. 07/839,986, filed: Feb. 20, 1992.

The subject matter in the following listed applications is related to and is included as part of the subject application. Each of the following listed applications is owned by the same assignee as the subject application, is filed on the same day as the subject application, and has the same priority date as the subject application. They are:

"Communicating Messages Between Processors And A Coupling Facility" by D. A. Elko et al, Ser. No. 07/860,380, "Sysplex Shared Data Coherency Method and Means" by D. A. Elko et al, Ser. No. 07/860,805, "Command Quiesce Function" by D A Elko et al, Ser. No. 07/860,330, "Storage Management For A Shared Electronic Storage Cache" by D. A. Elko et al, Ser. No. 07/860,897, "Management Of Data Movement From A SES Cache To DASD" by D. A. Elko et al, Ser. No. 07/860,806, "Command Retry System" by D. A. Elko et al, Ser. No. 07/860,378, "Integrity Of Data Objects Used To Maintain State Information For Shared Data At A Local Complex" by D. A. Elko et al, Ser. No. 07/860,800, "Management Of Data Objects Used To Maintain State Information For Shared Data At A Local Complex" by J. A. Frey et al, Ser. No. 07/860,797, "Recovery Of Data Objects Used To Maintain State Information For Shared Data At A Local Complex" by J. A. Frey et al, Ser. No. 07/860,647, "Message Path Mechanism For Managing Connections Between Processors And A Coupling Facility" by D. A. Elko et al, Ser. No. 07/860,646, "Method And Apparatus For Notification Of State Transitions For Shared Lists of Data Entries" by J. A. Frey, et al., Ser. No. 07/860,809, "Method And Apparatus For Performing Conditional Operations on Externally Shared Data" by J A Frey, et al , Ser. No. 07/860,655, "Apparatus And Method For List Management In A Coupled DP System" by J. A. Frey, et al., Ser. No. 07/860,633, "Interdicting I/O And Messaging Operations In A Multi-System Complex" by D. A. Elko, et al., Ser. No. 07/860,489, and "Method and Apparatus for Coupling Data Processing Systems" by D A Elko, et al , Ser. No. 07/860,803.

FIELD OF THE INVENTION

This invention relates generally to the field of coupled data processing systems. More particularly, it deals with distributed lock management for resources shared between coupled systems.

BACKGROUND OF THE INVENTION

Data processing systems have long used "locking" as a means for insuring data integrity. At its most fundamental level, locking a resource is a technique used by a process to prevent its use by another process until the locking process is finished with it—this locking technique being termed "exclusive" locking. In large Data Processing (DP) systems, where data sharing and parallel transaction processing is the rule, it becomes increasingly important to insure that this locking does not result in unnecessary delay of transactions (e.g., because a critical resource in performing the locking becomes unavailable, or because the locking is not at a sufficiently low level of granularity, or because the locking protocol does not recognize requests that may proceed in parallel—e.g., simultaneous READ requests).

To deal with these and other problems in loosely coupled systems environments, a number of design approaches have developed: one approach, which employs IMS Resource Lock Managers (IRLM's) in each system of a loosely coupled environment, provides local hash tables to record information about hold and wait locks for local applications, and selective wait lock information for other applications; message protocols communicate lock information with other systems when necessary. Details of this approach may be found in U.S. Pat. No. 4,399,504, "Method and Means for the Sharing of Data Resources in a Multiprocessing, Multiprogramming Environment" by Obermarck, et al., issued Aug. 16, 1983; and in U.S. Pat. No. 4,480,304, "Method and Means for the Retention of Locks Across Systems, Subsystem, and Communication Failures in a Multiprocessing, Multiprogramming, Shared Data Environment", by Carr et al., issued Oct. 30, 1984; both are assigned to the assignee of the present invention, and are incorporated herein by reference.

An alternate approach (detailed in U.S. Pat. No. 4,965,719, "Method for Lock Management, Page Coherency, and Asynchronous Writing of Changed Pages to Shared External Store in a Distributed Computer System", by Shoens, et al., issued Oct. 23, 1990, assigned to the assignee of the present invention) shows the use of a single "interest manager" which is a mediator for lock requests, and a focal point for all lock requests.

Both the above approaches have some disadvantages, such as the need for frequent messages concerning locks among processors, and the potential loss of status information in the event of a failure of an individual IRLM or interest manager.

A different approach, called distributed global locking, is described in IBM Technical Disclosure Bulletin, Volume 31, No. 1, June 1988, p. 206, "Distributed Locking Facility for Multi-system Data Sharing". Here global locking information is maintained on a distributed basis, though, again, inter-system messaging is relied on to maintain the information, and a priority scheme is used to resolve locking contention.

Building upon these developments of the prior art, it is an object of the present invention to minimize the overhead of global locking; that is, to reduce to a minimum the additional instructions needed to be executed to satisfy global locking protocols.

It is a further object of the present invention to limit the time that a transaction is delayed because of locking protocols—the transaction synchronous delay (TSD).

It is still a further object of the present invention to promote shared data availability by permitting (in the case of loss of local data) processing against undamaged data, while, at the same time, allowing recovery operations to proceed on the damaged portions.

It is still a further object of the present invention to provide a flexible mechanism whereby lock managers can implement different locking compatibility matrices, priority queueing schemes, or other locking protocols so as to resolve locking contention in a way which most effectively meets the serialization requirements of their clients.

SUMMARY OF THE INVENTION

A Central Coupling Facility (also called Structured External Storage Facility (SES)), accessible by all processors in a Sysplex (system complex) is used as a focal point for locking resources shared by transactions executing within the Sysplex. Multiple instances of a particular data manager (e.g., DB2; IMS) each have a local lock manager (comprising a tailored lock manager (TLM) and a system lock manager (SLM)) running in a system of the Sysplex (e.g., an MVS system). A serialization request is processed first at the local level based on a local hash table; if possible, access is granted or denied based on local knowledge. If necessary, the SLM communicates (via an efficient message mechanism) with the lock manager in the SES (SESLM) which centrally maintains lock information in a SES list structure, which contains a lock table, and a set of "lists" (each list associated with a TLM/SLM pair).

A distributed locking protocol is also employed so that certain locks may be locally managed, with the set of locally managed locks dynamically changing, and communication between lock managers (instigated by the SESLM) undertaken when necessary to effect the distributed ownership.

BRIEF DESCRIPTION OF THE DRAWINGS

FIG. 5 is a flowchart showing SLM lock escalation.

FIGS. 11A, 11B and 11C together comprise a flowchart showing control flow for lock table entry processing.

FIGS. 22A, 22B and 22C together comprise a time line diagram illustrating processing on a complex including two processors sharing a SES, during lock negotiation.

DESCRIPTION OF THE PREFERRED EMBODIMENT

System Structures

Figure 1:
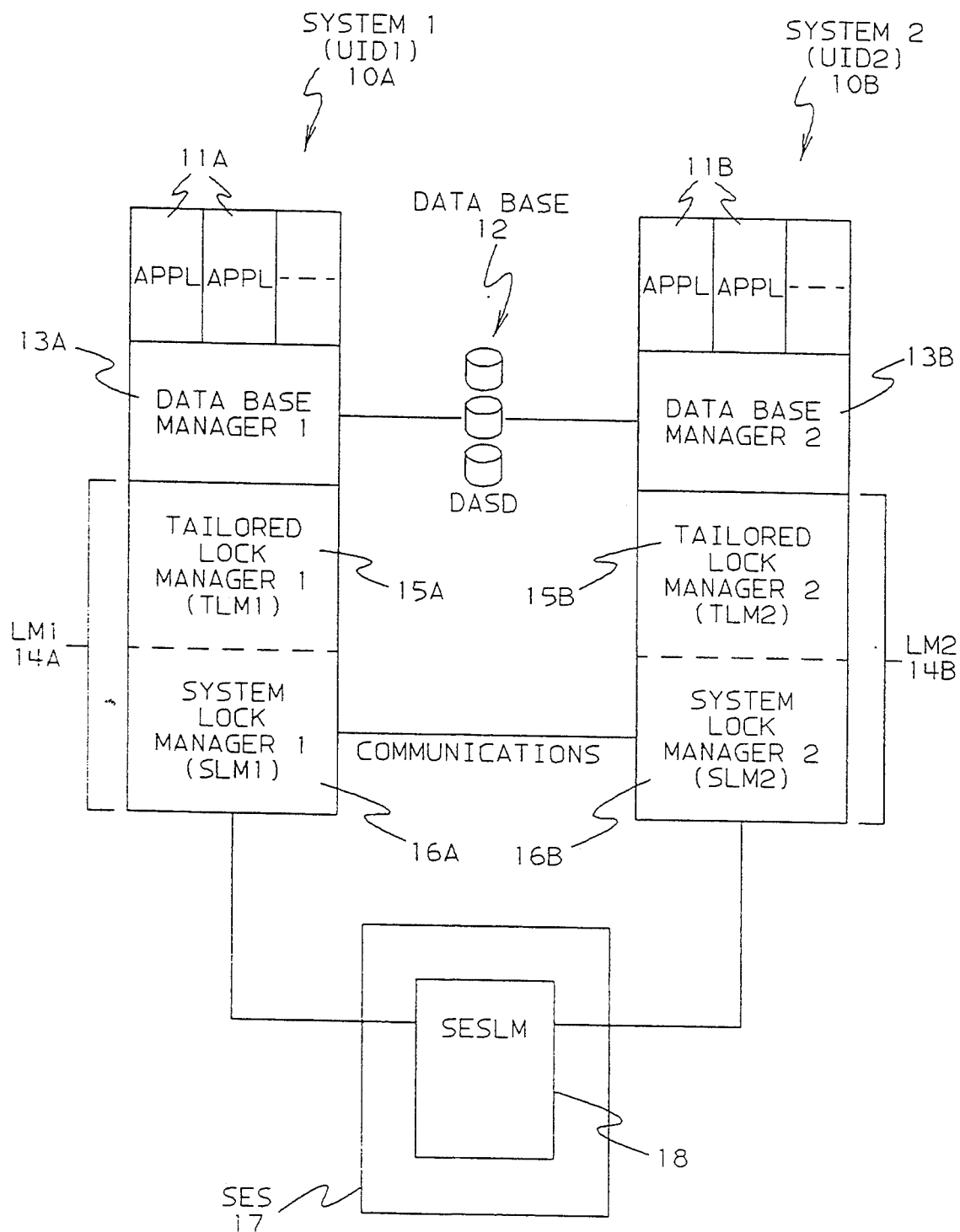
FIG. 1 is a block diagram illustrating system structure with data sharing.

The environment in which the present invention operates is shown in FIG. 1. Applications (11A, 11B) execute on multiple operating system images (10A, 10B) (executing on one or more processors) and are provided access to shared data 12 through a data base manager (13A, 13B). The data base manager retrieves information requested by the application from a data base 12 on direct access storage devices (DASD). (It will be apparent to those skilled in the art that no generality would be lost if, for example, the data were maintained in an in-storage cache, or other locations.) Serialization of data accessed by the data base manager is controlled by requests made from the data base manager to the associated lock manager 14A, 14B. The lock manager utilizes operating system services termed the system lock manager 16A, 16B to achieve a global locking facility. The system lock manager utilizes system services for communications between instances of the system lock manager and lock manager functions 18 resident in a Structured External Storage (SES) facility 17.

In one implementation of this system structure, applications are transaction programs executing in IMS message processing regions or CICS application owning regions. Requests are made to the IMS data base manager to access logical records stored in a hierarchical data base managed by IMS. IMS utilizes the IMS Resource Lock Manager (IRLM) to achieve serialization of data base records. During initialization, IRLM requests the services of the system lock manager (SLM).

In a second implementation of this system structure, applications are transaction programs executing in IMS message processing regions or CICS application owning regions. Requests are made to the DB2 data base manager to access data stored in a relational data base managed by DB2. DB2 utilizes the (IRLM) to achieve serialization of data base records. During initialization, IRLM requests the services of the system lock manager (SLM).

In a third implementation of this system structure, applications may be transaction programs executing in CICS application owning regions or programs which are not initiated in response to a transaction. These applications make requests of the Data Facilities Product (DFP) to access records stored in a Virtual Sequential Access Method (VSAM) supported data set. DFP provides a Lock Manager as part of its function. The DFP lock manager utilizes the operating system locking services (SLM).

In each of the implementations, there may exist multiple instances of the data base manager and associated lock manager executing on the same or different operating system image. All instances of the lock manager for a data base manager which is providing access to a shared data base utilize a single structure (LIST—see FIG. 2 at 18) to resolve potential contention and must communicate to resolve contention. (Multiple structure implementations are also within the spirit and scope of the present invention.) Operating system services are provided which facilitate communications among the instances of lock managers providing serialization to a shared set of data and enable access to a given SES List Structure.

Figure 2:
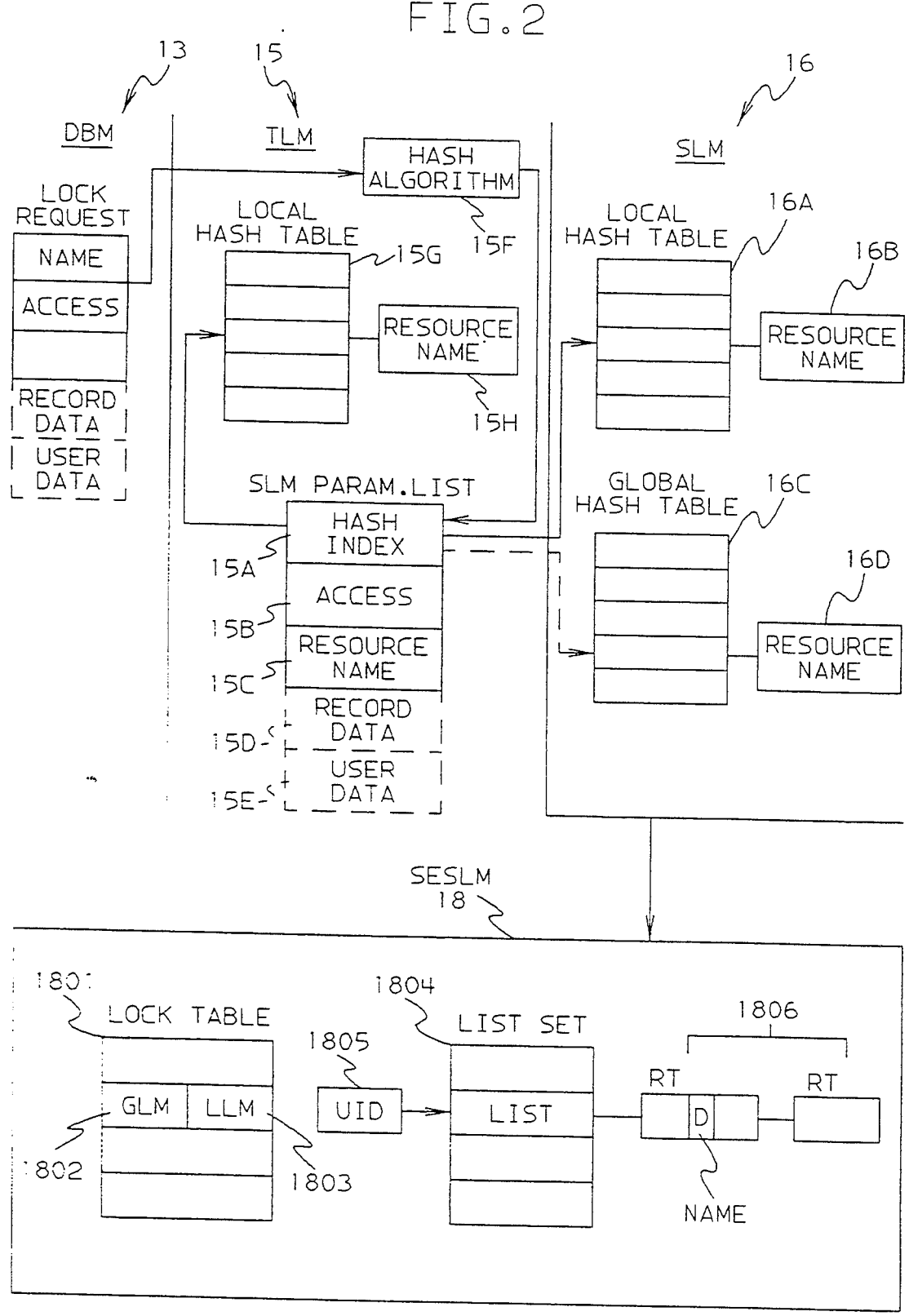
FIG. 2 is a block diagram showing lock request structures and interactions.

On any given operating system image, there may exist multiple data base managers and multiple instances of a given data base manager. The system services for communications and SES access support multiple, discrete sets of lock manager instances. The System structure for global locking facility is shown in FIG. 2. The structures maintained by the system lock manager and access to a given SES List Structure are isolated between data base manager environments which do not provide common access to shared data.

The system lock managers 16 (SLM's) receive locking requests from the lock manager 15 (TLM) supporting subsystems like IMS and DB2. When possible, a synchronous lock grant is effected (with or without access to the SESLM, as appropriate). When a synchronous grant is not possible, the request is passed to the SLM which is performing the global lock manager function for that resource, which may be on the same or different CPC, using a system signalling service. A transaction requesting a lock may be suspended until the lock is granted by the global manager. A request to release the lock does not require suspending the transaction. The system lock manager may communicate immediately with the global lock manager, or may wait and bunch several locking requests into a multipart message. Bunching achieves lower locking overhead at the cost of longer TSD.

Speaking generally, a lock associates state information with a resource name. The state information indicates accessing privileges (e.g., share, exclusive), ownership, etc. Locks may be thought of as an abstract data type whose representations as patterns of bytes are not visible to the lock users—in fact, the bytes may be dispersed among hardware and software components, and some values may be recorded doubly to satisfy recovery requirements.

Turning to locking facilities such as the list structure in the present invention, one consideration is the storage area set aside for locking information. The space may be sufficient for 40 times the number of locks held at any instant, yet still be able to handle only a fraction of the potential inherent in the name space. For example, IMS allows $2^{152}$ names while lock storage may provide for only $2^{18}$ locking entries. A mapping of 19-byte lock names into entries is necessary.

Figure 3:
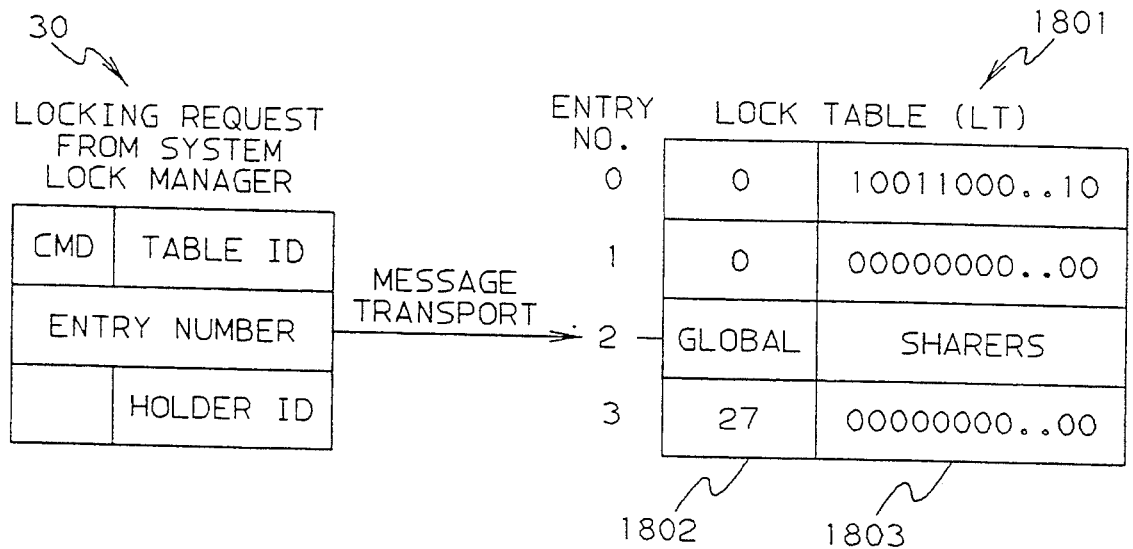
FIG. 3 is a block diagram showing a Lock Table.

The method of organizing lock storage is shown in FIG. 3. Here, each of the entries in the lock table 1801 holds state information for a congruence class of lock names. A program algorithm determines the entry number for a given name (FIG. 2 at 15F). The state information supports a shared-exclusive locking protocol and the distribution of the global lock manager function among the CPCs. The entries have a field 1803 for identifiers of the share holders of locks for names that map to the entry, and another field 1802 to identify the lock manager that is either the only exclusive holder of locks for names that map to the entry, or is handling waiter queueing and contention resolution for the entry. Lock names are not stored in the table. A List structure (FIG. 2 at 1802) is defined with an associated Lock Table. As part of the atomic commands which reference the List structure, locking operations may be performed.

Locking Objects

Lock-Table: The lock table (FIGS. 2, 3 at 1801) is a sequence of objects, called lock-table entries. The number of lock-table entries is determined when the table is created, and is a power of 2 in the range of 1 to 2**32. The lock-table entries are numbered from zero to the lock-table-entry count less one. For a specific lock-table, the entries have one size which is a power of 2 in the range of 0 to the maximum lock-table-entry size. The size of the largest lock table is limited by the free space and the size of all the controls required to support the list structure.

Each lock-table-entry has a global-lock-manager (GLM) 1802 object and an optional local-lock-managers (LLM) 1803 object. A lock-table-entry whose size is one byte has only a global-lock-manager object. When a lock-table-entry size is greater than one byte, the leftmost byte is the global-lock-manager object, and the remaining bytes form the local-lock-managers object. Lock tables with an entry size of one byte do not support local-lock-managers. Lock tables with an entry size of at least two bytes do support local-lock-managers.

The global-lock-manager object of a lock-table-entry contains an unsigned binary number called a user identifier.

The local-lock-managers object of a lock-table-entry contains a string of local lock bits, where each bit represents a user identifier. The bits in the object are numbered from left to right, starting at the value zero and proceeding upward to the bit for the highest value user identifier.

The lock-table objects have a value of zero when the table is allocated and may be modified by subsequent commands.

List Set: The list set is a sequence of objects, called lists (FIG. 2 at 1804). The number of lists is determined when a list set is created, and is from one to 2**32. The lists are numbered from zero to the list count less one.

List: A list is a sequence of objects, called list entries. The number of possible entries, from one to (2**32)−1, is determined when the list structure is created based on consideration of the available space within the structure and on the size of each individual entry.

List Entry: The relative position of a list entry in the sequence is determined when the entry is created and may be changed when any list entry is created, or deleted.

A list entry is located by means of a list-entry identifier assigned when the list entry is created or by position.

Locking Command Operands

Commands which change the content of locking objects at the shared electronic storage are controlled by request operands. Execution of commands generate response operands. The following operands are utilized in performing locking commands.

Adjunct List Entry (ALE): A 64-byte value that is conditionally read from or written to a list entry.

Comparative Global-Lock Manager (CGLM): A one-byte unsigned binary integer that is compared to the global-lock-manager object. This request operand is ignored unless the lock-request type is valid and specifies a comparison of the global-lock-managers.

List-Entry Type (LET): A two-bit value that indicates whether an adjunct list entry is read or written.

List-Number (LN): A four-byte unsigned binary integer that designates a list in a list set. Valid numbers are from 0 to the list count less one.

Local-Lock Manager (LLM): A bit string which identifies users with local interest in the lock-table-entry. When bit (i) is one, user (i) has indicated local interest. When bit (i) is zero, user (i) is either not currently accessing the lock table or has no local interest in the lock-table-entry. This request operand is ignored unless a local-lock-managers object exists and the lock-request type specifies global-lock and local-lock-manager replacement.

Local-Lock Bit (LLB): A one-bit value that is written to a local-lock-manager. This request operand is ignored unless a local-lock-manager is replaced.

Lock-Request Type (LRT): A three-bit value that indicates the type of lock request. It has the following encoding:
000 No lock process requested
001 Invalid
010 Invalid
011 Invalid
100 Compare the global-lock-managers
101 Replace the global-lock-manager
110 Replace a local-lock-manager
111 Replace the global-lock and local-lock-managers When a lock-request type of B'110' or B'111' is specified, the lock-table must have a local-lock-managers object.

Lock-Table-Entry (LTE): A value that is read from a lock-table-entry.

Lock-Table-Entry Number (LTEN): A four-byte unsigned binary integer that specifies an entry in a lock table. When a lock table is allocated, valid lock-table-entry numbers are from 0 to the lock-table-entry count less one.

User Identifier (UID): A one-byte unsigned binary integer that identifies a user. When the lock-request type specifies global-lock-manager and local-lock-managers replacement, the user identifier specifies a global-lock-manager. When the lock-request type specifies global-lock-manager replacement, the user identifier specifies a global-lock-manager and, when local-lock-managers exist, it also specifies a local-lock-manager. When the lock-request type specifies local-lock-manager replacement, the user identifier specifies a local-lock-manager. When the user identifier specifies a global-lock-manager, valid user identifiers are from 0 to 255. When the user identifier specifies a local-lock-manager, valid user identifiers are from zero to (8×lock-table-entry size)−9.

Locking Command Operations

Commands which support sysplex locking perform functions based on request operands. The following operations are performed by locking commands.

Comparing Global-Lock-Managers:

Global-lock-manager comparison always occurs before a lock-table-entry is written or may occur before a list entry is written, read or deleted, depending on the command code and lock-request type: The global-lock-manager object is compared with the comparative-global-lock manager specified. When they match, the global-lock-manager comparison succeeds, and the command continues. When they do not match, the global-lock-manager comparison fails, and response code 3 is returned.

Comparing Local-Lock Managers: Local-lock manager comparison may occur before a lock-table entry is written or before a list entry is written, read, or deleted, depending on the command code and the lock-request type: There are two lock-request types that cause local-lock-manager comparison: global-lock-manager replacement, and local-lock-manager replacement.

When a local-lock-manager object exists and a global-lock-manager replacement is requested, the local-lock-manager object value from the specified lock table entry is ANDed with a mask of all ones except for the local lock bit corresponding to the user identifier specified. This ANDed value is then compared with zero. When they match, the local-lock-manager comparison succeeds. When they do not match, the local-lock-manager comparison fails.

When a local-lock-manager object exists and a local-lock-manager replacement is requested, the local-lock-bit corresponding to the user identifier specified is compared with the local-lock-bit value specified. When they match, the local-lock-manager comparison fails. When they do not match, the local-lock-manager comparison succeeds.

When the local-lock-manager comparison fails, response code 2 is returned.

Writing a Lock-Table Entry: One or both of the objects contained within a lock-table entry may be replaced, depending on the lock-request type specified: A global-lock-manager may be replaced when a lock-request type of B'101' or B'111' is specified and the global-lock-manager comparison succeeds.

One or more local-lock-managers are replaced when a lock-request type of B'110' or B'111' is specified and the global-lock-manager comparison succeeds.

Replacing a Global-Lock Manager: The global-lock-managers are compared and the local-lock-managers may be compared when global-lock-manager replacement is requested: When the global-lock-manager comparison succeeds, the global-lock-manager may be replaced with the user identifier specified, regardless of whether or not the local-lock-manager comparison succeeds.

Replacing a Local-Lock Manager: The global-lock-managers and local-lock-managers are compared when local-lock-manager replacement is requested: When the global-lock-manager comparison succeeds, the local-lock bit corresponding to the user identifier specified may be replaced with the local-lock-bit-value specified, regardless Of whether or not the local-lock-manager comparison succeeds.

Replacing the Global-Lock and Local-Lock Managers: The global-lock-managers are compared when global-lock and local-lock-managers replacement is requested: When the global-lock-manager comparison succeeds, the global-lock-manager may be replaced with the user identifier specified and the local-lockmanagers are replaced with the local-lock-managers specified.

Writing a List Entry: A list entry may be written when an entry is created or replaced. List entry creation is requested on a write-list-entry command. A list entry is created at the first entry position relative to the designated position (the position designation for creating elements of a list used for locking specifies either first or last element on the current list) and the relative position of all succeeding entries is increased by one. A list entry may be replaced on a write-list-entry command. The position of an entry is not affected when it is replaced. When a list element is created, a SES generated list element identifier is returned to programming.

Reading a List Entry: A list entry may be read on a read-list-entry command. The position of an entry is not affected by a read operation.

Deleting a List Entry: A list entry may be deleted on a delete-list-entry command. An entry is deleted at the first entry position relative to the designated position, and the relative position of all succeeding entries is decreased by one. Position description for deleting elements is by list element identifier.

Commands Support Locking Operations

The following commands are supported at the shared electronic storage facility and utilized to achieve sysplex locking functions.

Figure 10:
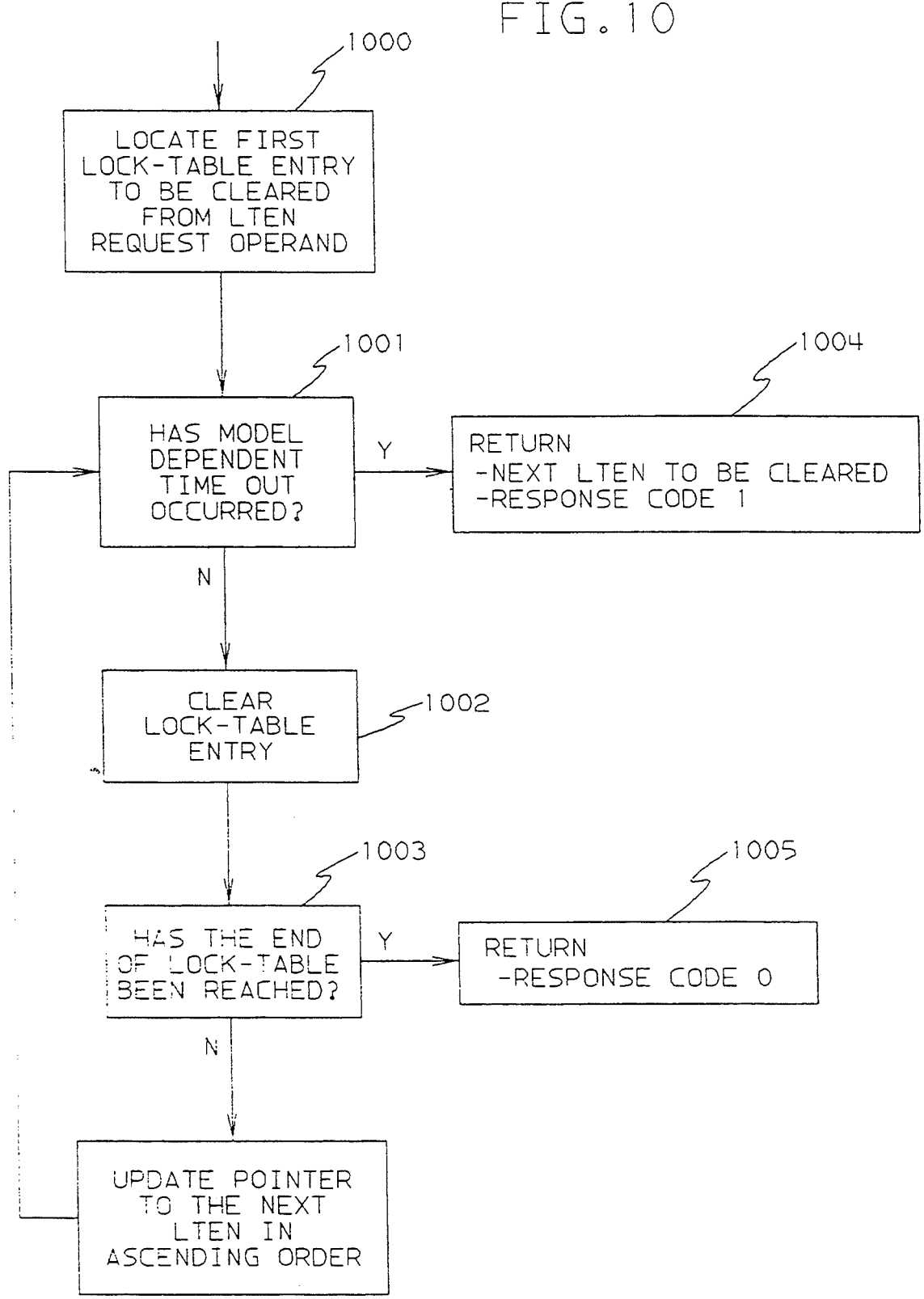
FIG. 10 is a flowchart showing control flow for the CLEAR LOCK TABLE command.

Clear Lock Table: FIG. 10 illustrates this processing. The clear-lock-table command zeros the lock-table entries (1002) starting at the lock-table-entry number specified and proceeds sequentially in ascending lock-table-entry number order until a model-dependent time period elapses (1001) or the end of the lock table is reached (1003).

When the end of the lock-table is reached before a model-dependent time period has elapsed, response code 0 is returned (1005).

When a model-dependent time period has elapsed before the end of the lock-table is reached, the lock-table-entry number of the next entry in the sequence that has not been cleared and response code 1 are returned ( 1004 ).

Figure 11A:
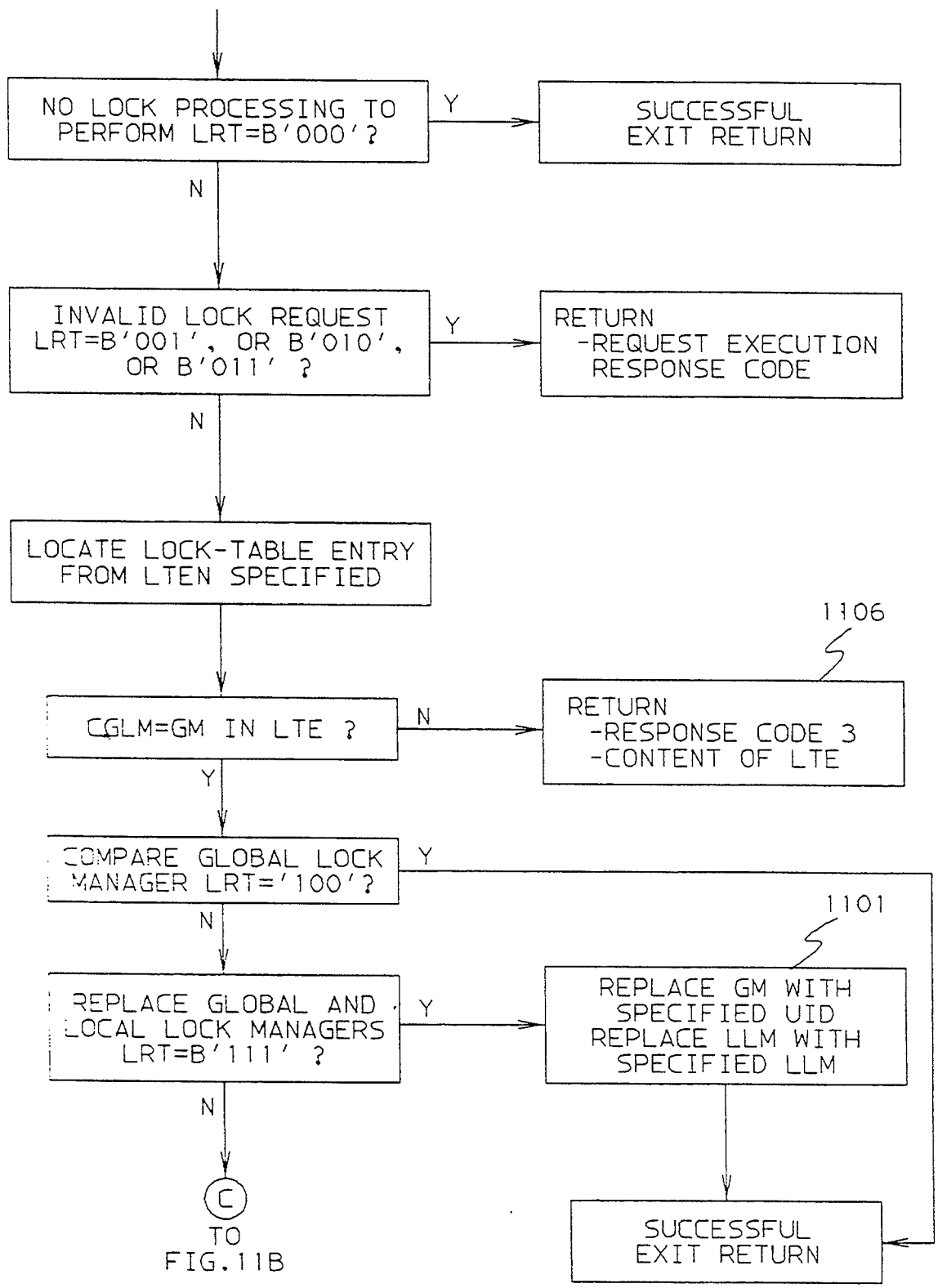
Figure 11B:
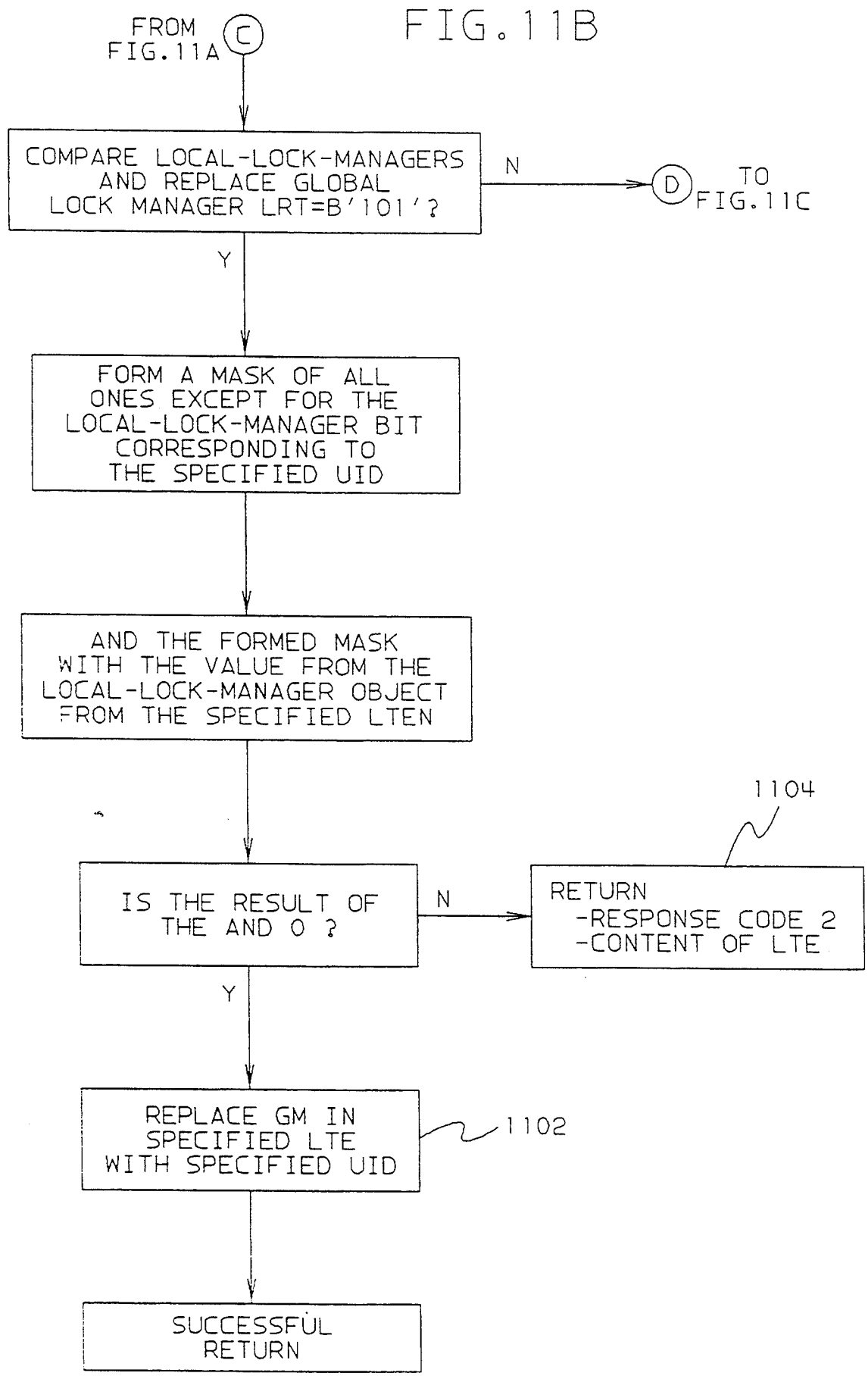

Write Lock-Table Entry: The write lock-table-entry command performs only the processing associated with updating a lock table entry, as shown in FIG. 11. The write lock-table-entry command compares the global-lock-managers and conditionally replaces the global-lock-manager, the local-lock-managers, or both.

When a global-lock-manager is replaced and there are no local-lock-managers or when a global-lock-manager is replaced and local-lock-manager comparison is unsuccessful (1102), or when a local-lock-manager is replaced with the opposite value 1103, or when the global-lock and the local-lock-managers are replaced 1101, response code 0 is returned.

When a global-lock-manager is replaced and there are one or more other local-lock-managers 1104, or when a local-lock-manager is replaced with the same value 1105, then the lock-table-entry value and response code 2 are returned.

When global-lock-manager comparison fails 1106, the lock-table-entry value and response code 3 are returned.

Figure 12:
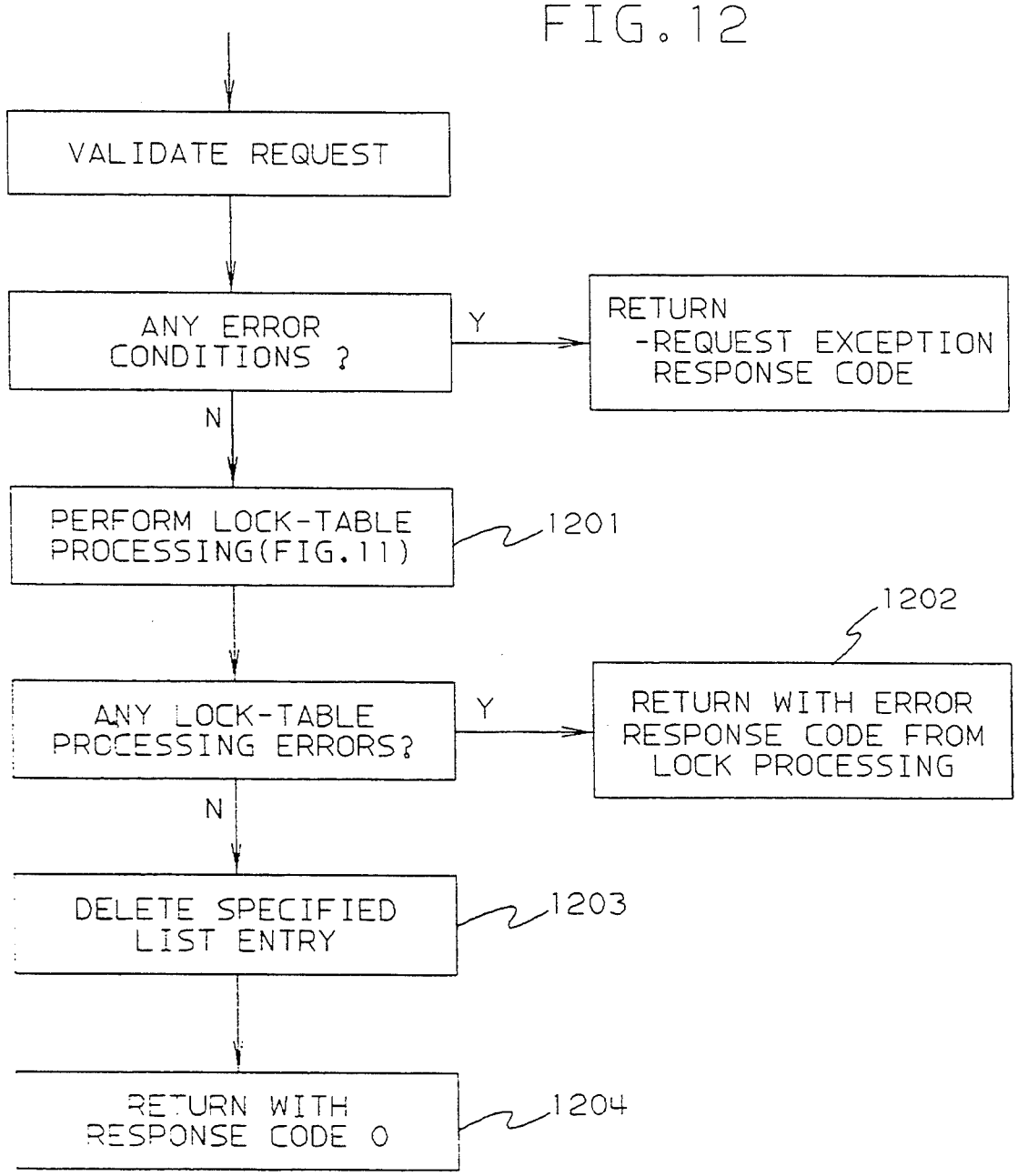
FIG. 12 is a flowchart showing control flow for the DELETE LIST ENTRY command.

Delete List Entry: FIG. 12 illustrates this processing. The list entry is located and processing (1201) as requested by the lock request type is performed. If lock-table processing is requested, it is performed as shown in FIG. 11. In order for a list entry to be deleted (1203, 1204), lock-table entry processing ( 1201 ), when requested, must succeed. When a list entry is deleted, response code 0 is returned (1204). Otherwise, an error code is returned (1202).

Figure 13:
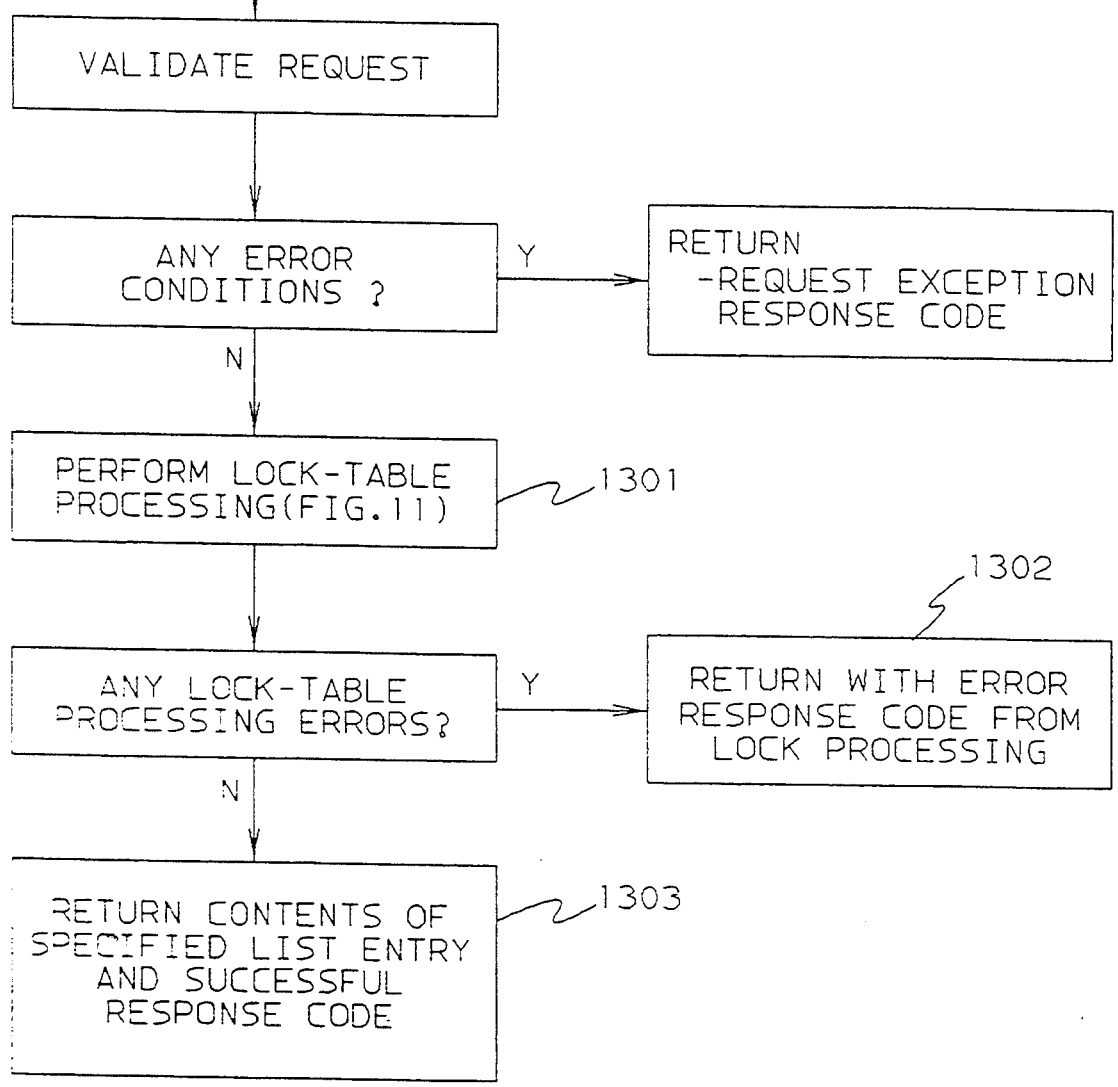
FIG. 13 is a flowchart showing control flow for the READ LIST ENTRY command.

Read List Entry: FIG. 13 illustrates this processing. If lock-table processing is requested, it is performed as shown in FIG. 11. In order for a list entry to be read, lock-table-entry processing (1301), when requested, must succeed. When a list entry is read, response code 0 is returned (1303). An error return is given otherwise (1302).

The ability to read multiple entries on a list is supported by the SES list structure. More than a single list entry can be returned by the SES facility. Additionally, the SES facility can return the list element identifier of the element on the list which follows the last list element returned. The Read List command first locates the specified list entry. A list entry may be specified by requesting the first element on a list or specified by list element identifier. Lock processing as requested by the lock request type is performed. If the requested lock-table-entry processing is successful, list entries are read and placed in the specified data buffer. Processing of the Read List command is ended when the data buffer is full, when a SES model dependent time out occurs, or when the end of the list is reached. For data buffer full and time out conditions, the list element identifier of the next element on the list is returned by the Read List command.

Figure 14:
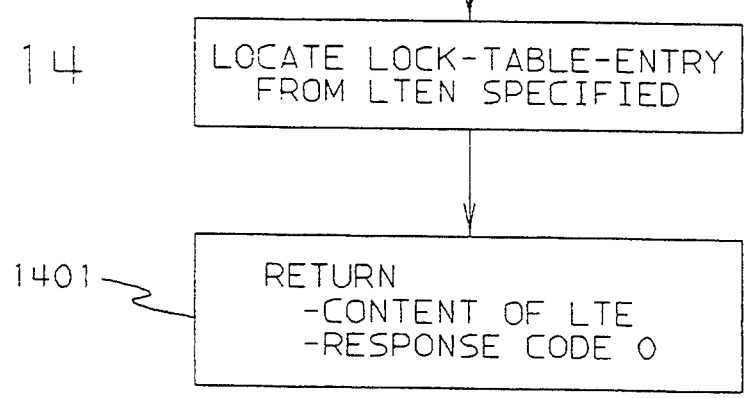
FIG. 14 is a flowchart showing control flow for the READ LOCK TABLE ENTRY command.

Read Lock-Table-Entry: FIG. 14 illustrates this processing. The lock-table-entry value of the lock-table-entry specified by the lock-table-entry number request operand and response code 0 are returned 1401.

Figure 15:
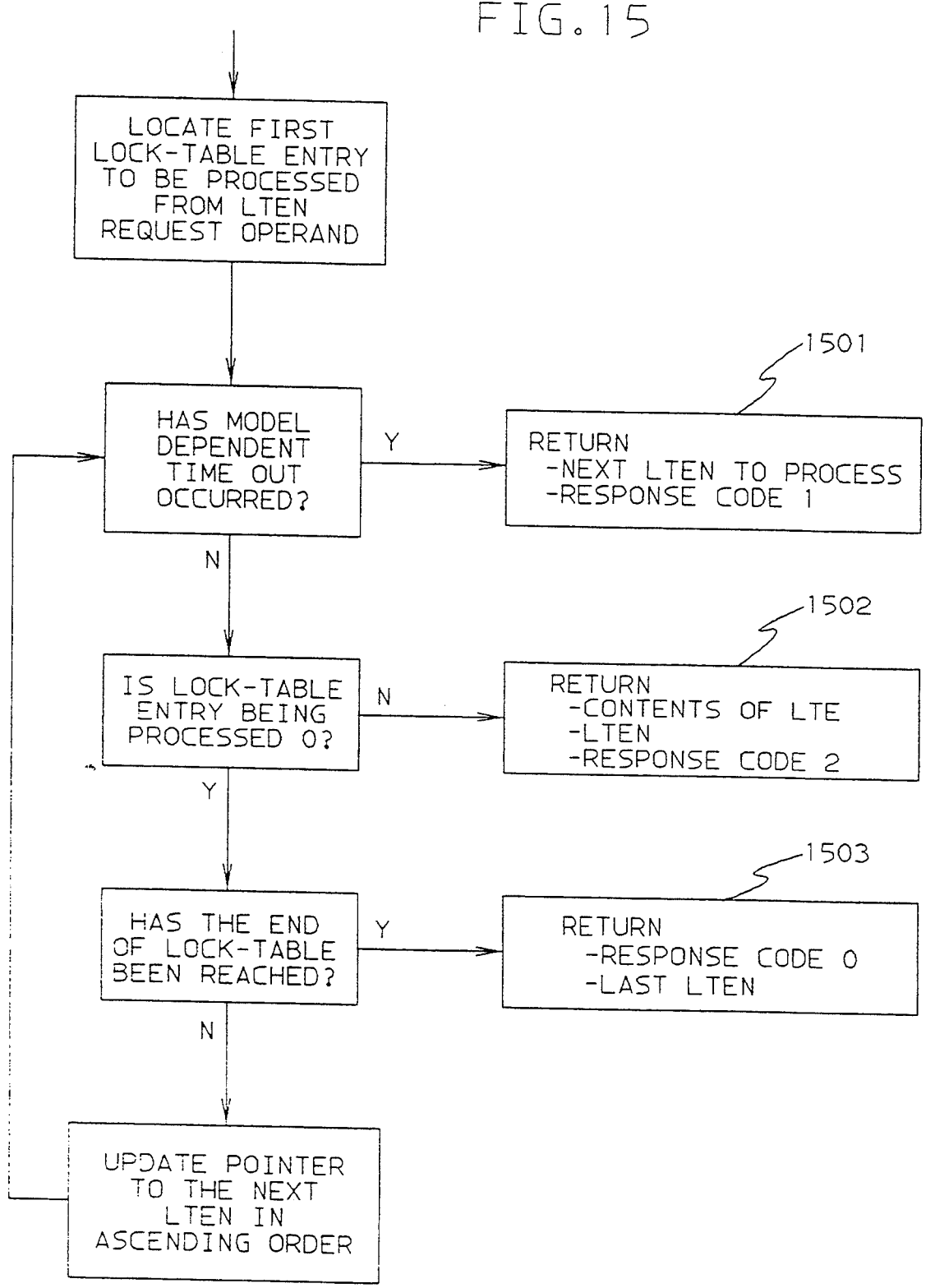
FIG. 15 is a flowchart showing control flow for the READ NEXT LOCK TABLE ENTRY command.

Read Next Lock-Table-Entry: The read next lock-table-entry command scans the lock-table-entry starting at the lock-table-entry number specified and proceeds sequentially in ascending lock-table-entry number order until a nonzero entry or the end of the lock-table is reached, or a model-dependent time period elapses. FIG. 15 illustrates this processing.

When the end of the lock-table is reached without encountering a nonzero entry, the last lock-table-entry number and response code 0 are returned 1503.

When a model-dependent time period has elapsed before the end of the lock-table is reached, the lock-table-entry number for the next lock-table-entry in the sequence that has not been scanned and response code 1 are returned 1501.

When a nonzero lock-table-entry is reached, the lock-table-entry number, the lock-table-entry value, and response code 2 are returned 1502.

Figure 16:
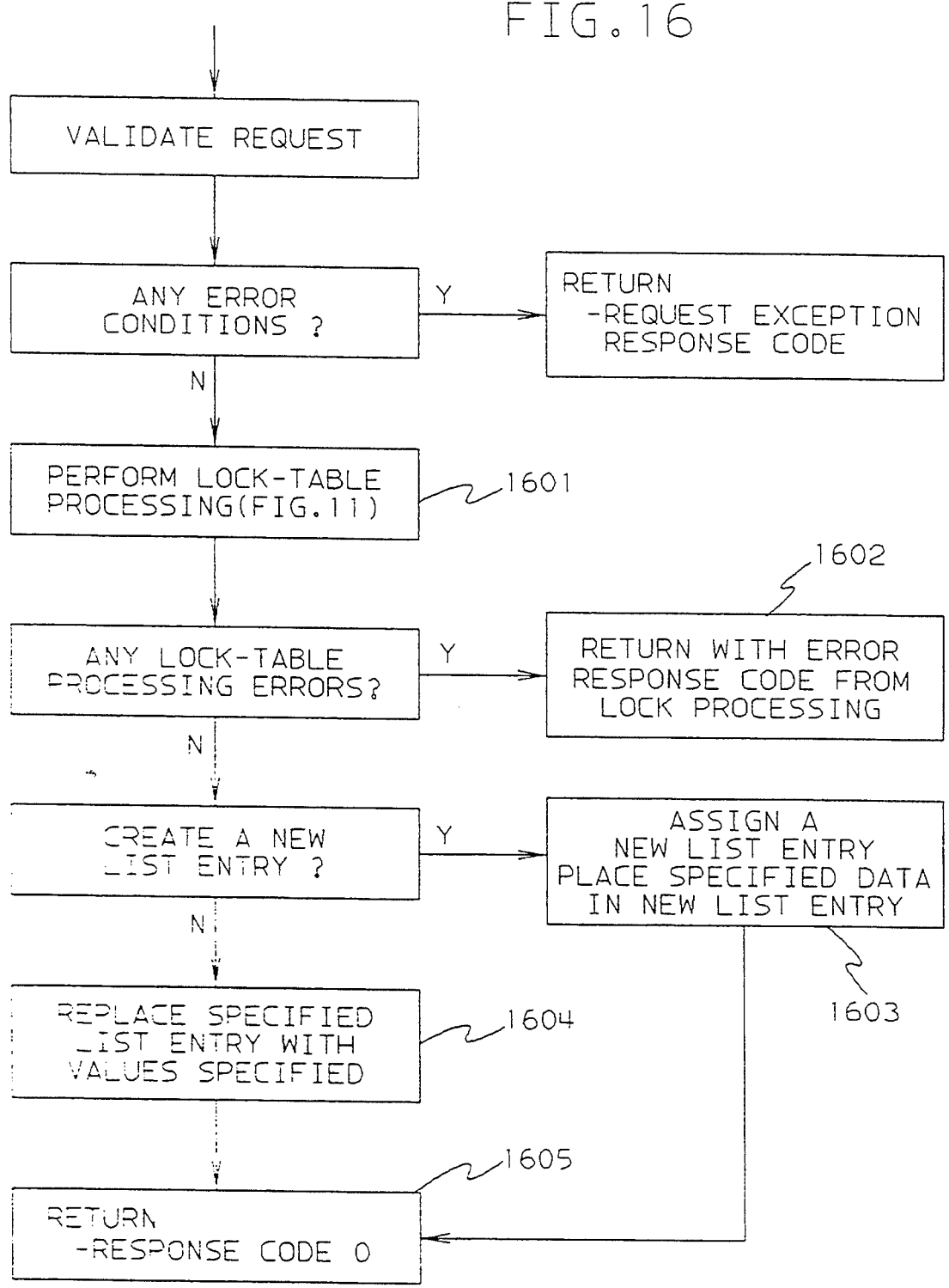
FIG. 16 is a flowchart showing control flow for the WRITE LIST ENTRY command.

Write List Entry: FIG. 16 illustrates this processing. The list position is located and processing as requested by the lock request type is performed (1601). If lock-table processing is requested, it is performed as shown in FIG. 11. In order for a list entry to be written, lock-table-entry processing, when requested, must succeed. When a list entry is written, response code 0 is returned (1605).

When list entry creation is requested, a new list entry may be added to the specified list number (1603). When list entry replacement is requested, the content of an existing list entry may be replaced by the values specified with the command (1604). An error return is given in the event of lock-table processing errors (1602).

SLM Functions

The SLM provides interfaces in support of initialization, termination, mainline functions requesting locking services, and recovery services. During initialization of a lock manager supporting a data base manager (e.g., IRLM) SLM initialization functions are invoked. The SLM initialization functions initialize local and global hash tables (FIG. 2 at 16A, 16C) and request operating system services to initialize communications functions. Communications to only those SLM instances supporting access to a common set of shared data is achieved by definition of a sharing group with a predefined name. This name is provided by the data base lock manager to the SLM. The provided name also is utilized by the SLM to identify the SES List Structure to be used. Operating system services which enable operations to be presented to the SES List Structure assign the User Identifier (UID) to be associated with the initializing lock manager.

Each instance of the SLM performs two roles—lock manager and global lock manager. For both, a control structure is maintained comprised of a hash table and control blocks chained from the hash table entries which represent the status of serialized resources. The SLM associates a lock table entry in the SES list structure with each hash table entry. Status associated with the hash table includes the current state of the SES lock table entry associated with the hash table entry. SLM utilizes the assigned UID as the List Number within the List Set of the SES List Structure being used (FIG. 2 at 1805). Record Table data associated with modify (exclusive) locks held by the lock manager are contained in list elements associated with the UID of the lock manager instance.

The global lock manager processes locking requests against a table which reflects the status of all locks known to it. Four generic services provided by the SLM/TLM are described next.

(1) Contention Detection: A lock may be held with one of several accessing privileges. Ownership can be granted when the privileges of the holders, if any, are compatible with the privileges needed by a new requester. For example, one approach allows a lock to be requested with either share or exclusive privilege. SLM processing will not grant the lock with exclusive privilege until the lock has no other holders. Share privilege is granted if the present holders have only share privilege, but not when a holder has exclusive privilege. When a lock is globally managed, the TLM will determine the set of holders, and may allow any combination of share and exclusive privilege.

The TLM may manage the lock states with a compatibility matrix. Then, when a lock is locked more than once, its composite mode carries the privileges of all of the modes requested by its holders. Contention occurs when the privileges of a requester and those of the present holders are incompatible.

(2) Waiter Queueing: When the global lock manager cannot grant the lock, it preserves a record of the request on a list of waiters. Rules for processing the waiter queues are part of the architecture of the TLM. FIFO queueing on a per-name basis could be specified, and other rules might be needed to meet the requirements of recovery processing. There may be different queue-processing rules for different subsystems. A further description of action taken when a lock request cannot be granted are contained following the heading "Contention Management Protocols".

(3) Contention Resolution: When a lock is unlocked, the global lock manager within the SLM deletes the requester from the list of holders or waiters, as appropriate. If the resource is being managed by the TLM, the SLM notifies the TLM of the change in lock ownership.

When a holder is deleted, the new mode of the lock is determined by the TLM from the privileges of the remaining holders, and new holders may be assigned from among the waiters. The SLM notifies the appropriate TLM(s) when the lock is granted.

(4) Availability and Recovery Recording: The TLM may be asked to mark a lock to prevent its being granted to a new owner following an equipment or program failure. A subsequent request may ask that a state consistent with recovery processing be established. Rules for handling these requests are part of the data base manager and TLM architecture. For example, a rule describing the manner in which marking applies to the waiter queue as well as to the present set of owners is needed.

The SLM interface for lock requests requires the following to be provided:
Resource Name (FIG. 2 at 15C)
Hash Table Value (FIG. 2 at 15A)
Requested State (Access) (FIG. 2 at 15B)

The resource name identifies the portion of the data base to be serialized. The hash table value indicates which entry in the hash table is to be used to manage serialization of the named resource. The requested state may be shared or exclusive. The shared and exclusive states are mapped by the SLM to the Global Lock Manager and Local Lock Manager values supported by the lock table of the SES List Structure. Optionally, the following may be provided:
Record Data (15D)
User Data (15E)

If provided, the Record Data is written to a list element associated with the UID of the requesting lock manager. The user data will be maintained by the SLM and presented to the contention exit of the associated lock manager when resource contention occurs.

SLM initialization functions accept as input from the lock manager, identification of a set of exit addresses. These exits are given control when the following predefined events occur: The Contention Exit is given control when serialization requests for a resource are not compatible. The Notification Exit is given control when the associated lock manager owns a resource which has been requested in an incompatible state and the contention exit which is managing contention for the resource indicates the owning lock managers are to be notified.

The complete exit is given control when serialization requests for resources can not be granted immediately and the issuer of the request has chosen to have control returned prior to completion of the serialization request.

Once a lock manager instance has completed initialization, requests of SLM services may be made.

Recovery Recording

The global locking function (in the SLM and SESLM) also provides for recording names of locks which are accorded modify (exclusive) status in two electronically separated places. Each system lock manager maintains a list of the names of all locks (resources) held with MODIFY status for its TLM (FIG. 2 at 16B). Additionally, the names of all modify locks are recorded in the SESLM (FIG. 2 at 1806).

The SES List Structure (1804) provides both a locking function and a recording function. Modify (exclusive) lock names are recorded in the list elements (1806). A list within the list set is assigned to each instance of the system lock manager participating in the global, sysplex locking protocols. Entries on the list associated with a system lock manager instance contain the modify (exclusive) lock names. Since the SES facility is electronically isolated from any instance of the system lock manager, it provides the necessary availability for modify (exclusive) lock names. Atomic operations (including the commands for creating, reading, replacing, and deleting list elements) are defined which manipulate lock table entries and record modify (access exclusive) lock names in list elements.

SLM Lock Obtain Processing

Figure 4:
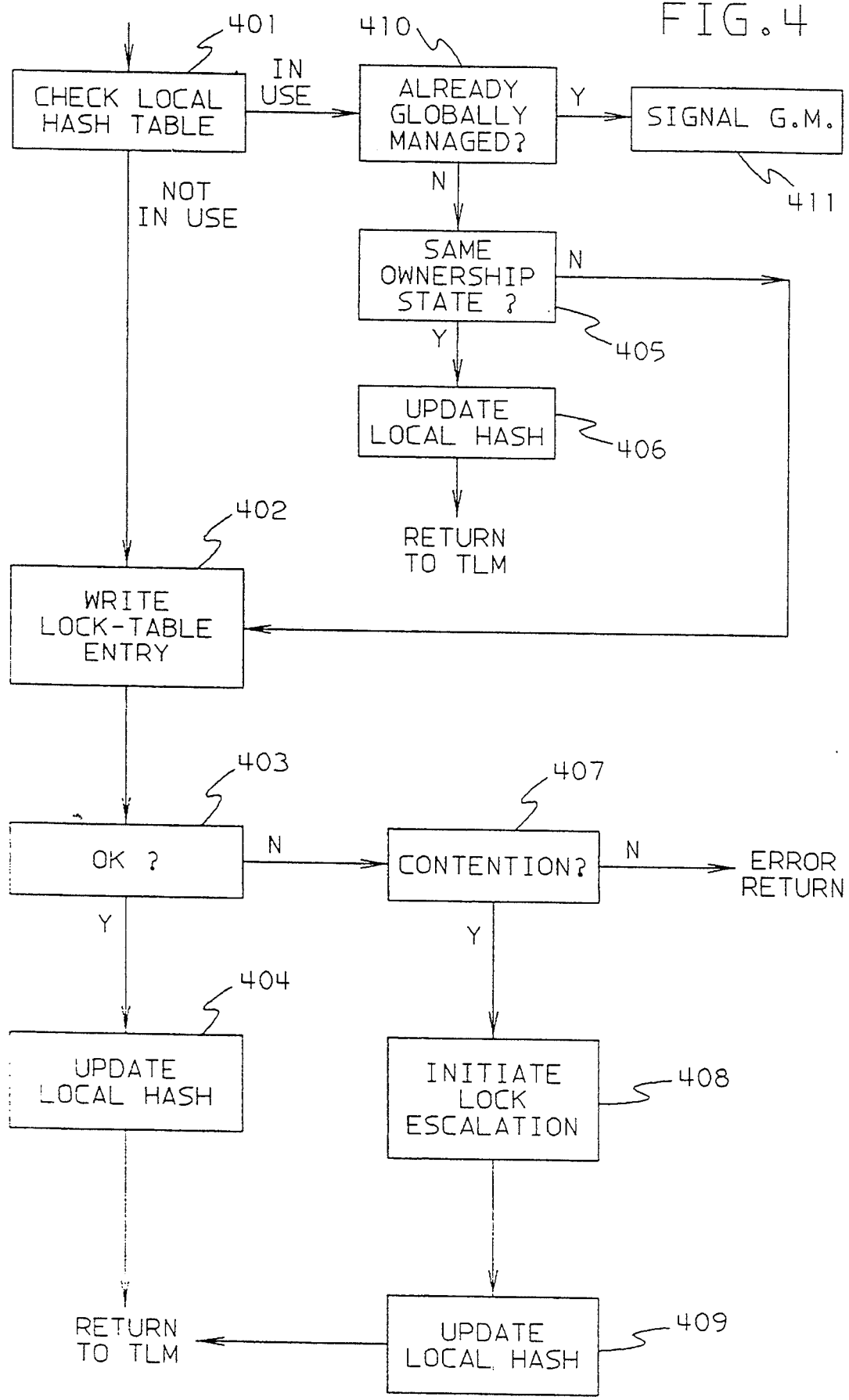
FIG. 4 is a flowchart showing SLM Obtain Lock Processing.

FIG. 4 shows control flow within an SLM when a lock is requested. At 401, the hash table entry associated with the request is located and checked for being in use. If this hash table entry is not already in use, a command is formulated to access the SESLM. If the lock request does not have record data associated with it, a write lock table entry command is initiated. If the lock request has record data associated with it, a write list entry command is initiated. If a write list entry command is to be initiated, the locking options for the command are the same as the locking options which would be used if a write lock table entry command were to be initiated. If the locking operation requested by the write list entry command complete successfully, the record data will be written to a list entry as described in processing for the write list entry command. In the following, a write lock table entry command is described. A write lock table entry request is formulated 402. The nature of this write lock-table entry request depends on the nature of the lock request: for a share lock, the global lock manager value is compared to zero (to insure no exclusive ownership of the lock-table entry), and the local-lock-manager bit associated with this instance of the SLM (identified by UID) is requested to be set to 1. (Replace local-lock-manager.) The lock-table entry number is that one whose value corresponds to the specified hash table entry. For an exclusive lock request, the write lock-table entry command differs from the share request, and "record table" data is also present (see FIG. 2 at 15D) to represent the "modify (exclusive) lock". As with the write lock-table entry for share, the global lock manager value is compared to zero—but, here, the global lock manager value is also replaced with the UID of this SLM (Replace Global Lock Manager).

Next, 403, a test is made of the return code from the SESLM. A response code indicating that the operation was successful is followed by updating 404 the control block structure of this SLM as a local-lock-manager (FIG. 2 at 16A) to show that the hash table entry is owned in a shared state or exclusive state, as appropriate to the write lock-table request used, and a control block representing the serialized resource is placed on a queue anchored by the hash table entry (FIG. 2 at 16B). (Note that, if this is a SHARE request, other owners may be present.)

If the test at 401 indicated "in use", a test is made 410 if the resource is already globally managed (indicated as described below for block 409). If so, the global manager is signalled 411 (triggering the processing described in FIG. 5). If not, a test is made 405 if the specified hash table entry is owned in the state requested. If not, an update to the SES lock-table-entry is required and performed beginning at 402, as indicated. If so, the control block structure of this SLM as a local-lock-manager is updated 406 with the control black representing the serialized resource (queueing it to the specified hash table entry—see FIG. 2 at 16B).

If the test at 403 did not indicate successful completion of the write lock-table entry command, a test is made at 407 whether the failure was because of contention. This may be indicated by a response code of 3, along with return of the lock-table entry, from the SESLM. This may also be indicated by a response code of 2 if, for example, a TLM makes an exclusive request against a lack table entry which has some Other TLM holding a shared interest in it. In these cases where the lack request did not complete successfully due to contention, the lack table entry contents is returned and is used by the SLM to determine the set of other interested TLMs (vis either the global byte or the LLM bit string). In these cases, the SESLM serves as a focal point for storing information about the set of interested SLM/TLMs holding some interest in the hash class represented by the lack table entry. If contention, the lack escalation process is begun 408 (see FIG. 5). The value returned by the SESLM in the lock-table entry identifies the instance of the SLM (by UID) which will assume global management responsibilities for the lock-table entry. The local-lock-manager is updated 409 to show that the hash table entry is globally managed (see FIG. 2 at 16C).

The requester of a lack may indicate that control is to be returned if the serialization request can not be immediately satisfied. If this option has been selected, and the lack request can not complete immediately (411 or 408), control is returned to the requester and the lack processing proceeds as indicated asynchronously to execution of the requester. When the lack request has completed, from 510 or 705 or 702, the complete exit will be given control with the results of the lock request. When the lock request completes, the state in which the lock is held and the user data may be modified from the requested values.

SLM Escalation Processing

The SLM flow of control for the escalation process is shown in FIG. 5. The global manager portion of an SLM instance receives a signal (from another SLM) requesting global management for a lock table entry associated with a hash table entry (FIG. 4 at 408 and 411). The SLM global management function first determines 501 if the hash table entry is already being globally managed. If it is, the next check determines 502 if a request is already being processed against the hash table entry. If a request is in progress, this request is placed on a wait queue 503 until the current process is complete.

Figure 6:
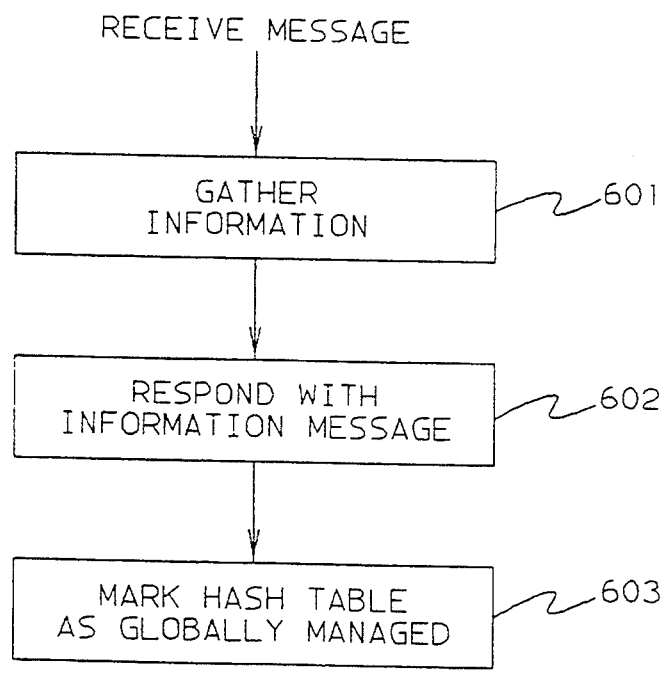
FIG. 6 is a flowchart showing control flow within the SLM on receipt of a request to gather resource information related to a hash table entry.

The SLM global management function maintains a representation of the hash table in control blocks in processor storage (FIG. 2 at 16C and 16D). For a hash table entry which is not already globally managed, the hash table entry being escalated to global management is marked as being globally managed 504 (i.e., being managed by the TLM) and as having a request in progress. A message is sent 505 to each instance of SLM identified in the lock table entry as having ownership of the lock table entry requesting that resource information is requested. Each receiving SLM instance gathers information regarding the resource name(s), state and user data (FIG. 6) from the local hash table (FIG. 2 at 16A) and associated resource name control blocks (FIG. 2 at 16B) into a message in response to the SLM globally managing the hash table entry. (See FIG. 6 at 601). The responding SLM(s) send the message 602, and mark the local lock manager hash table entry as being globally managed by the SLM originating the message 603.

When all responses have been received (FIG. 5 at 506) with resource information for a hash table entry being escalated to globally managed, control blocks representing the resource name(s), owners, state and associated user data are built 507 and placed on a queue anchored by the globally managed hash table entry (FIG. 2 at 16C and 16D). If the current request is not in conflict with the resources currently associated with the hash table entry (i.e., if the resource name is not owned in an incompatible state), control blocks representing the request currently being processed are built and queued to the globally managed hash table entry (509). A "write list entry" is performed 514 to update "Record Data" if necessary A message is then sent to the originating SLM instance indicating the lock request can be granted (510).

When the originating SLM receives the message, it may resume execution of the requesting TLM work unit or cause the complete exit to be given control. The TLM work unit is resumed if the work unit was suspended during lock request processing. If the TLM requested control be returned if the lock request could not complete immediately, the complete exit will be given control with a parameter list which identifies the lock request which is completing. When the lock request completes, the state in which the lock is held and the user data may be modified from the requested values.

When processing has completed for a request against a globally managed hash table entry, the global SLM function checks to see if other requests have been queued. If requests have been queued, processing is initiated for the first request on the queue (511).

If the resource name for the current process is owned in an incompatible state, the SLM global management function builds a parameter list for the lock manager contention exit (512). The lock manager contention exit is given control and the SLM global lock manager delays processing until a response from the contention exit is received (513).

Figure 7:
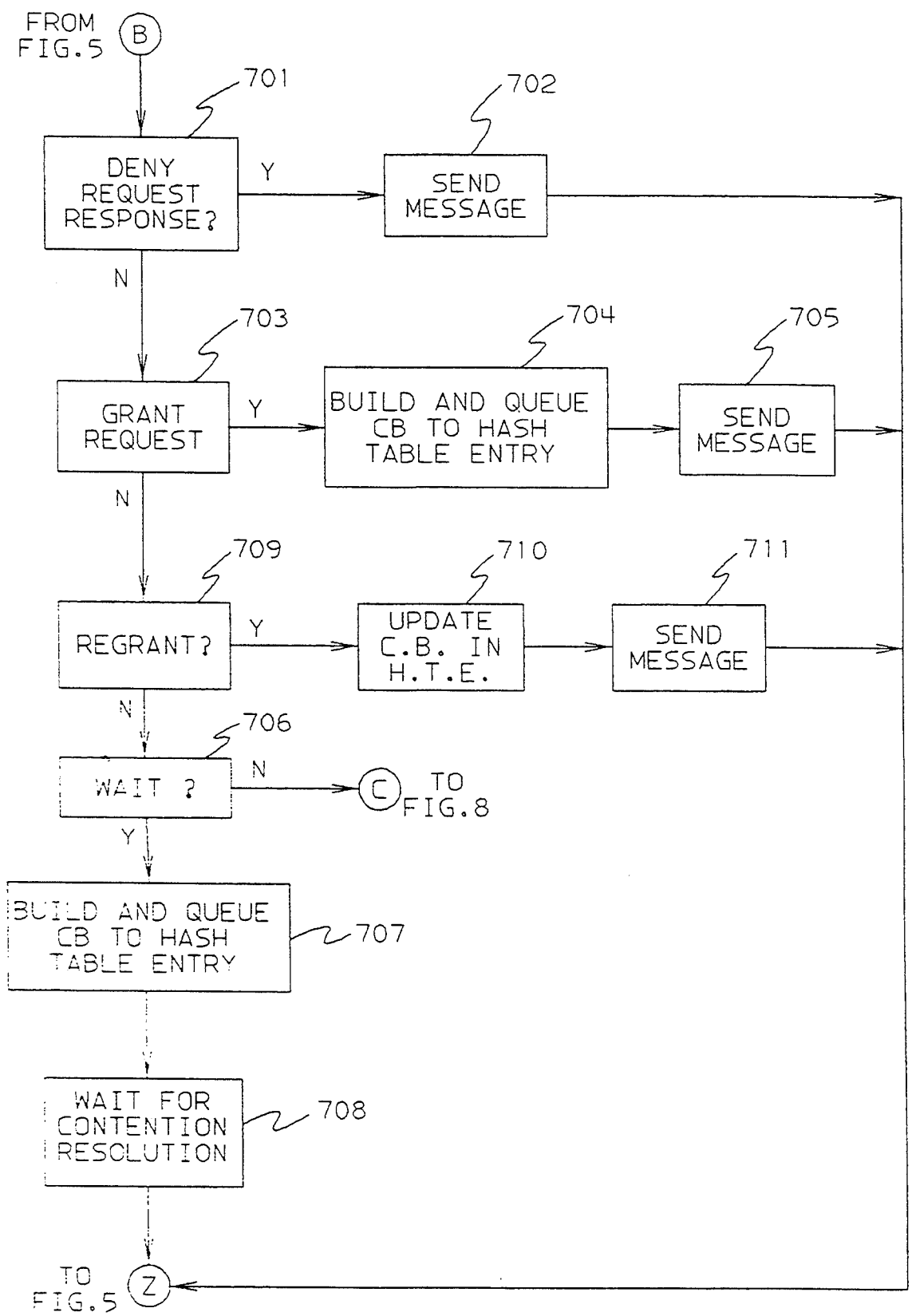
FIG. 7 is a flowchart showing control flow for SLM escalation contention exit.

In FIG. 7, processing resumes from the contention exit. If the response is to deny the current request 701, a message is sent 702 to the SLM from which the request originated indicating the lock request is rejected. If the response is to grant the current request 703, a control block representing the resource name, state, and user data from the request are queued 704 to the globally managed hash table entry (see FIG. 2 at 16C, 16D). When the TLM elects to grant the current request, the lock state and user data associated with the lock request may be changed by the TLM contention exit. If the state and/or user data is requested to be changed, the SLM updates the global control structure to represent the modifications requested by the TLM contention exit. Then a message is sent 705 to the SLM from which the request originated indicating the lock request is granted. When the originating SLM receives the message, it may resume execution of the requesting TLM work unit or cause the complete exit to be given control. The TLM work unit is resumed if the work unit was suspended during lock request processing. If the TLM requested control be returned if the lock request could not complete immediately, the complete exit will be given control with a parameter list which identifies the lock request which is not completing. When the lock request completes, the state in which the lock is held and the user data may be modified from the requested values.

Figure 19:
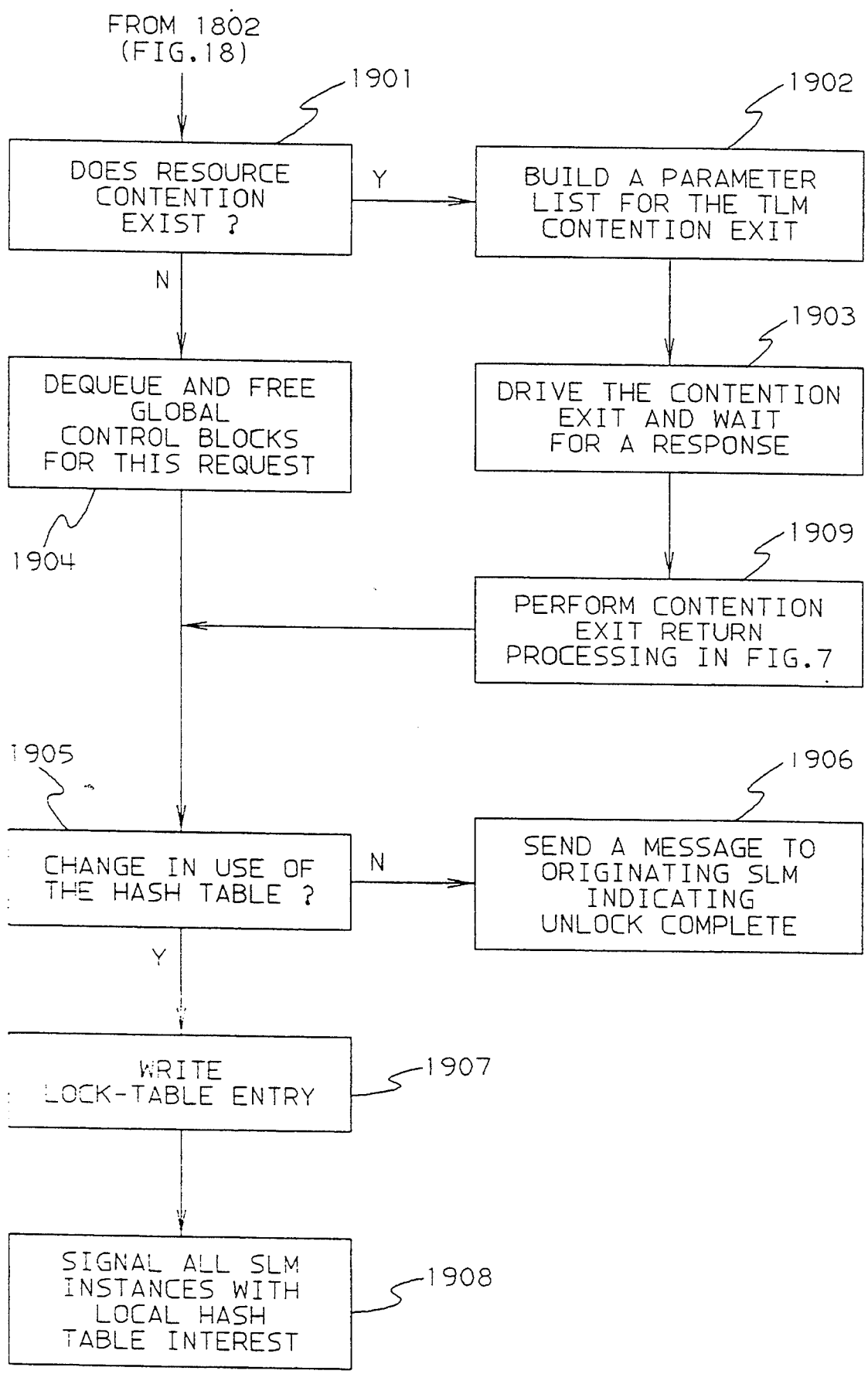
FIG. 19 is a flowchart showing the TLM flow of control for lock de-escalation (Global Unlock).

If the response is to regrant a request for the lock (709), the control blocks associated with that request are updated (710), and a message is sent to the SLM from which the request which was regranted originated (711) indicating the changed state or user data value. The originating SLM presents these changes to the TLM in the complete exit. If the response is to wait the request 706, control blocks are built 707 to represent the resource name, state, and user data from the request are queued to the globally managed hash table entry. These requests wait 708 until an unlock process causes the request to be made compatible (as shown in FIG. 19 at 1902 and subsequently at 1909, and in FIG. 7 at 703), or until they are granted or denied by the TLM's contention exit in the course of processing other requests in the request queue.

Figure 8:
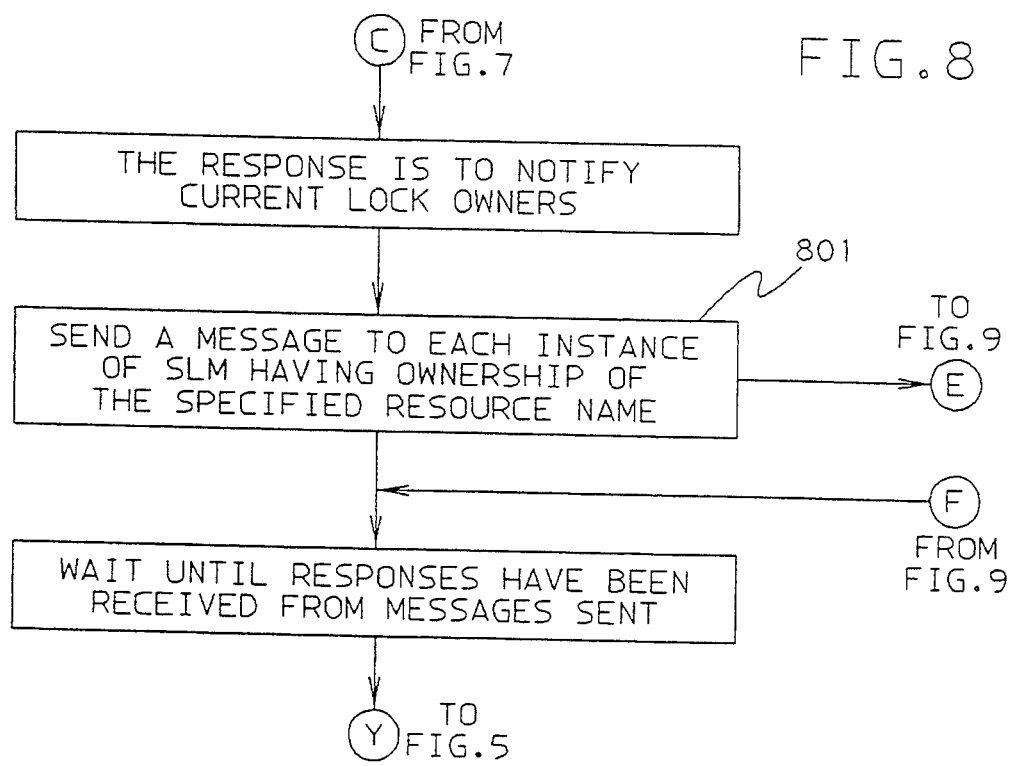
FIG. 8 is a flowchart showing control flow for the SLM escalation notification process.

The response from the contention exit may indicate that notification is to be provided to current lock owners ("NO" at 706). Related processing is shown in FIG. 8. A message is sent 801 to each instance of SLM having ownership of the resource identified in the request being processed. Each SLM which receives a message (FIG. 9 at 901) to drive the notify exit builds a parameter list 902 for the lock manager notify exit. The notify exit is given control 903 and the SLM delays until a response is received from the notify exit. Processing by the TLM in the notify exit may request changes to the state in which a lock is held and/or update the record data for the lock. If the TLM has requested changes in the lock state or record data, these changes are processed by the SLM on return from the TLM notify exit at 906. In the notify exit, the lock manager may unlock the identified resource or change the user data associated with the current ownership of the resource. Unlock or user data changes for the specified resource are gathered 904. Any updates indicated to be necessary in the Notify Exit (State/User Data/Record Table Data) are placed 906 in the local system's SLM data structure (FIG. 2 at 16A, 16B). The information gathered at 904 is placed into a response message sent 905 to the instance of the SLM which is performing the global management function for the hash table entry. When all responses from the notify exit have been received, a parameter list is built and the SLM global management function optionally drives the contention exit again (FIG. 5 at 512, 513), presenting it with the new state of resources and requests.

SLM Unlock Processing

Figure 18:
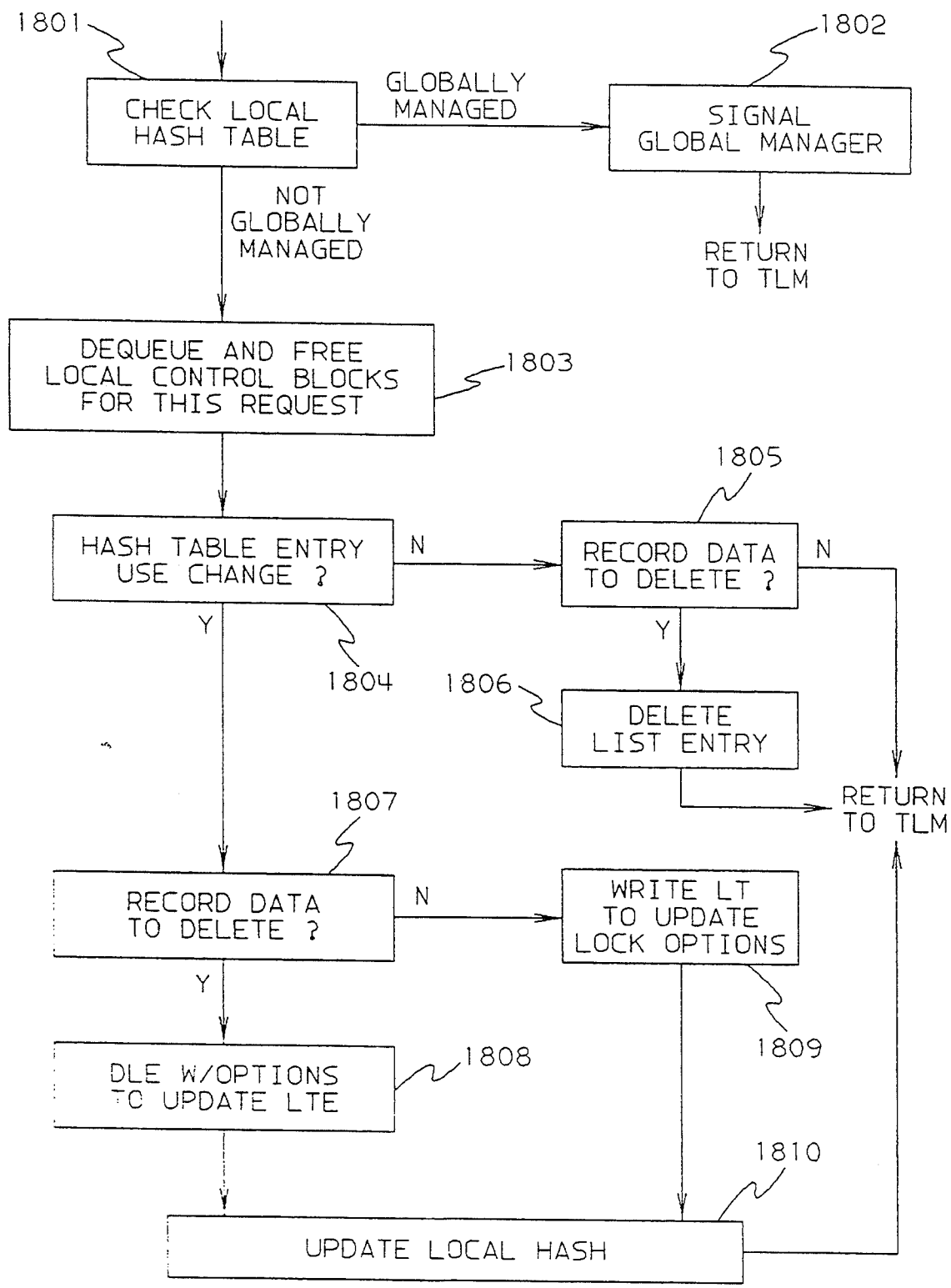
FIG. 18 is a flowchart showing SLM Unlock processing control flow.

FIG. 18 shows control flow within an SLM when an unlock request is processed. At 1801, the hash table entry associated with the request is located and checked for being globally managed. If this hash table entry is not globally managed, the control block representing this request is dequeued from the local control structure (16A and 16B in FIG. 2) and freed (1803). If this is the last request for a named resource, the local control structure for the resource name is dequeued and freed.

An unlock request may result in a change in use of the hash table entry (1804). An exclusive unlock may result in locks being held in a share state for all other resources which are associated with the hash table entry. If the use of the hash table entry does not change as the result of an unlock, and RECORD data is to be deleted (1805), the SLM initiates a Delete List Entry (1806) to the SESLM to delete the RECORD data. If the SLM is to delete record data, the requests to the SESLM may be initiated with the asynchronous option. Processing at the CPC will be overlapped with execution of the delete list entry command. Unlock processing and deletion of record list entries are not required to be performed synchronously. Then, the SLM returns to the TLM. If the use of the hash table entry changes (1804), a command to the SESLM will be formulated. If, as part of changing the use of the hash table entry, record data is to be deleted (1807), a delete list entry command will be initiated (1808). If changing use of the hash table entry does not also require record data to be deleted, a write lock table entry command is initiated (1809). If a delete list entry command is to be initiated, the locking options for the command are the same as the locking options which would be used if a write lock table entry command were to be initiated. If the locking operation requested by the delete list entry command completes successfully, the record data will be deleted from a list entry as described in processing for the delete list entry command. In the following, a write lock table entry command is described. The nature of this write lock-table-entry request depends on the nature of the unlock request: if all resources associated with the hash table entry are left held in a share state and the lock-table-entry is held in an exclusive state, the global-lock-manager value is compared to the UID associated with the SLM, the global-lock-manager value is replaced with zero, and the local-lock-manager value associated with the UID of the SLM is set to one; if there are no longer resources associated with the hash table entry and the hash table entry is held in an exclusive state, the global-lock-manager value is compared to the UID associated with the SLM, the global-lock-manager value is replaced with zero; if there are no longer resources associated with the hash table entry and the hash table entry is held in a share state, the global-lock-manager value is compared to zero and the local-lock-manager value associated with the UID of the SLM is set to zero. Changes made by the SLM to the lock table entry to unlock a hash table entry may be initiated with the asynchronous option. Processing at the CPC will be overlapped with execution of the write-lock-table entry command. Unlock processing and deletion of record list entries are not required to be performed synchronously.

The SLM then updates the local hash table entry status as appropriate (1810) and returns to the TLM.

If the hash table entry is globally managed, a signal is sent (1802) to the instance of the SLM/TLM which is currently the global manager of the hash table entry.

SLM De-escalation Processing

The SLM/TLM flow of control for the de-escalation process is shown in FIG. 19. The global manager portion of an SLM instance receives a signal (from another SLM) requesting an unlock operation for a resource which is associated with a hash table entry which is currently being globally managed (1802). The SLM first determines, based on the global structure (FIG. 2 at 16C and 16D), if contention exists for the resource name (1901). If contention does not exist for the resource name, the control block representing this request is dequeued from the global control structure and freed (1904). If this is the last request for a named resource, the global control structure for the resource name is dequeued and freed.

As a result of the unlock, the hash table entry associated with the request may require change in status. If the state of the hash table entry does not change, the SLM global management function sends a response signal to the originating SLM (1906). If the hash table entry is to change state, the SLM initiates an operation to the SESLM. If, as part of changing the use of the hash table entry, RECORD data is to be deleted, a Delete List Entry command will be initiated. If changing use of the hash table entry does not also require RECORD data to be deleted, a Write Lock Table Entry command is initiated. In each case, the global-lock-manager value is compared to the UID associated with the SLM which is the global manager. The setting of the lock-table-entry specified by the write lock-table-entry command is determined by the nature of the unlock request as follows: if there is no longer any interest in the hash table entry, the global-lock-manager and local-lock-manager values are replaced with zero; if there exists a single instance of SLM with exclusive interest in the hash table entry, the global-lock-manager value is set to the UID associated with that instance of the SLM; if there exists multiple instances of the SLM with shared interest in the hash table entry, the global-lock-manager value is set to zero and the local-lock-manager value is set to a value comprised of ones for all interested instances of the SLM and zeroes for all others.

If hash table entry becomes not globally managed, a signal is sent from the instance of the SLM performing the de-escalation to all instances of the SLM which continue to have interest in hash table entry (1908). SLM instances which receive this signal update local control block structure (2001) and local hash table entries (2002) to reflect local management of the hash table entry. If this is the last request for a named resource, the local control structure for the resource name is dequeued and freed.

If resource contention exists for the resource identified in the unlock request, a parameter list containing identification of the resource and all current requests for ownership is built by the SLM and presented to the TLM contention exit. Processing on return from the contention exit is shown in FIG. 7. As a result of an unlock request, the TLM may request notification of other instances of the TLM which currently holds interest in a resource, or the TLM may grant requests waiting for a lock, or the TLM may regrant lock requests previously granted. When requesting notification from the contention exit, the TLM may modify the state and user data associated with a request. When granting a lock from the contention exit, the TLM may modify the state and user data associated with a request.

When SLM/TLM processing of the contention exit has completed (1904), a determination is made by the SLM based on global control structure status (FIG. 2 at 16C and 16D) as to whether or not the associated hash table entry requires change in state (1905).

SLM Alter Service

Figure 21:
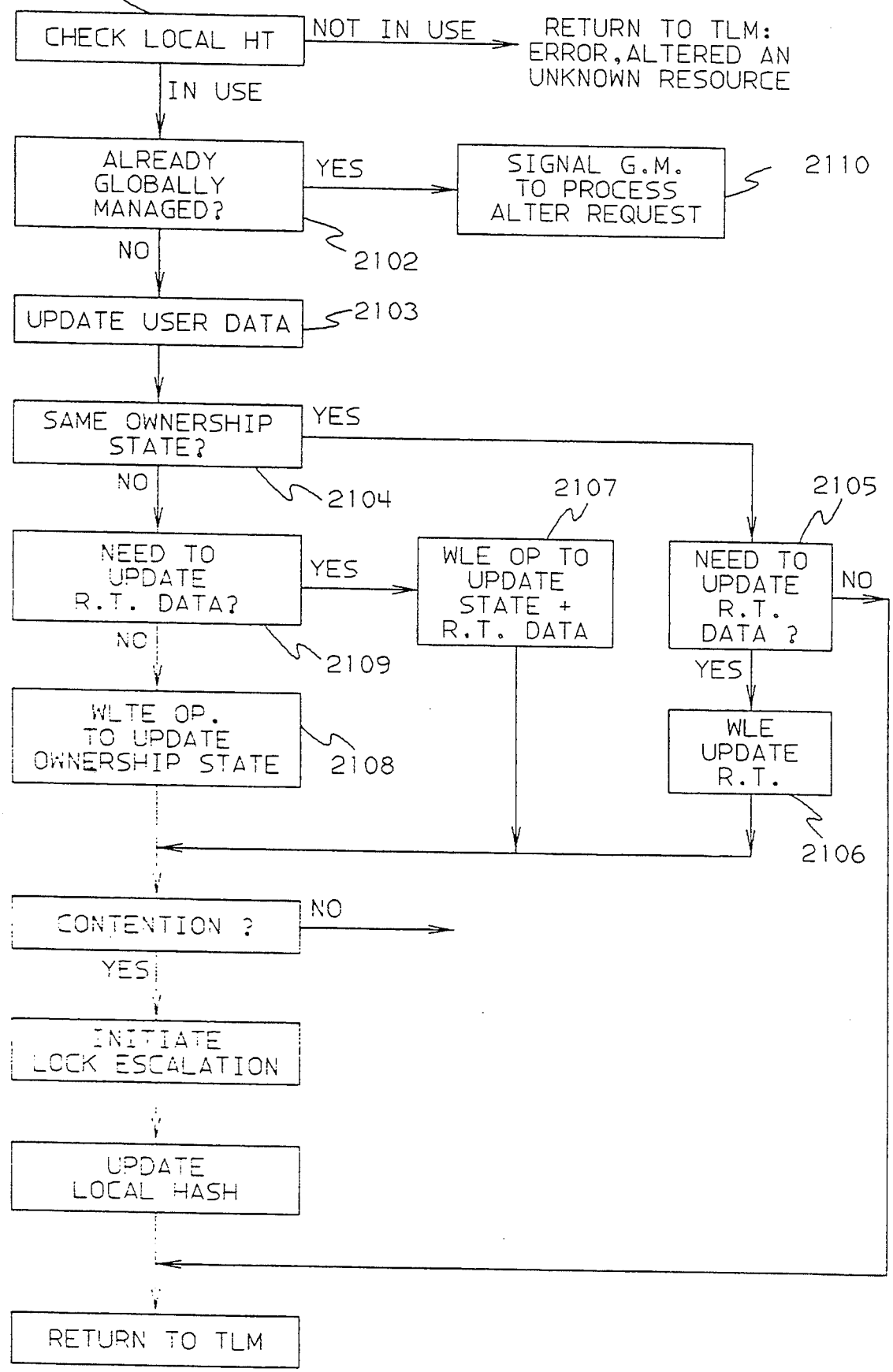
FIG. 21 is a flowchart showing control flow for ALTER processing.

SLM provides TLMs who hold a lock on a resource with the ability to alter the information pertaining to that locked resource. In particular, TLMs may alter the lock state (share versus exclusive), the user data associated with the lock, or the record data associated with the lock. Processing for the alter request in many ways resembles that for lock obtain or release requests, as described below, and illustrated in FIG. 21.

When an alter request is received from a TLM, the hash table entry associated with the request is located (2101) and checked for being globally managed (2102). If the hash table entry is globally managed, a signal is sent to the instance of the TLM/SLM which is currently the global manager of the hash table entry (2110). If this hash table entry is not globally managed, the control block representing this request is updated to reflect the altered lock state and user data (2103). If RECORD data is altered, the SLM issues a Write List Entry to modify the RECORD data.

An alter request may result in a change in use of the hash table entry. In this case, the SLM initiates an operation to modify the lock table entry associated with this hash class (2104 Y path). If an update to the record data is requested (2105 and 2109), SLM will perform a write list entry operation with lock options that will update the lock table entry and write the record data (2106 and 2107). If no update to the record data is requested, SLM will perform a write lock table entry operation to update the lock table entry (2108). The lock options requested in either case will depend on the current state in which the lock table entry is held, and on the requested state. After all necessary updates have thus been made, the SLM returns control to the TLM.

If the hash table entry is globally managed, processing proceeds as shown in FIGS. 5, 7, 8 and 9. The alter request is added to the global manager's request queue, and is presented to the contention exit (512) along with all the other resource and request information for the hash class (similar to lock obtain processing). As for a lock obtain request, the contention exit may choose to grant (703), deny (701), or wait (706) the alter request, and may request that the notify exit(s) of lock holders be invoked (801). (The lock manager(s) may in the notify exit choose to unlock or change the user data associated with the current ownership of the resource (906). When all the changes made by the notify exit(s) have been collected and recorded at the global manager, the contention exit is driven again, presenting it with the new state of resources and requests (512 and 513). When an alter request is either granted (703) or denied (701), a message is sent from the global SLM back to the requesting SLM, where the results are recorded in the local hash table, updates to the lock table and/or record data are made using the write lock table entry or write list entry operations, and the TLM is informed of the result.

Contention Management Protocols

The preceding discussion has described the processing for lock obtain, release, and alter requests without describing in detail what the lock manager may do using the interfaces SLM provides to implement specific locking protocols as required by their serialization needs. This section addresses these considerations.

The TLM may implement lock states over and above the simple shared/exclusive protocol that SLM itself recognizes. To do this, SLM provides the user data information that is associated with a lock obtain or alter request. The user data information can contain information about the specific "user" state in which the lock is requested (or held).

Given that lock-manager-specific lock states can be defined, the TLM may then manage those lock states with a compatibility matrix implemented by the decision-making algorithm of the TLM's contention and notify exits. Such compatability matrices are known in the prior art. When a lock is locked more than once, its composite state carries the privileges of all of the states requested by its holders. Contention only occurs when the lock state requested by a TLM is incompatible with the lock state(s) owned by the TLM(s) which presently hold the lock. Since the contention exit is presented with the entire request queue for the resource (including all the held instances of the lock and all the pending, instances of the lock), and since each request queue entry that is presented includes the lock state and user data information, the contention exit is presented with the necessary information to implement the compatibility matrix.

The TLM may choose to prioritize some requests ahead of other requests in the request queue, based on priority of the requestor or some other value of the TLM's choosing. The request priority can also be encoded in the user data field, which enables the contention exit to, for example, grant the pending request which is of the highest priority first, and "wait" all other pending requests which are not compatible with that granted request. In general, the order in which requests are granted is entirely within the control of the TLM's contention exit.

The TLM's contention exit also has the ability to modify the state and user data associated either with requested locks, or with locks that are held. That is, if a TLM requests a lock in the exclusive state, the contention exit may choose to grant the lock in the shared state; or if the TLM requests a lock with a certain user data value, the contention exit may grant the lock with a different value. Furthermore, the contention exit may request that a held lock be "regranted" with a different state and/or user data value. The TLM can use this ability to direct the resolution of contention by modifying either a request or a held lock, or both, so that according to the compatibility matrix which the TLM implements, the two are not incompatible. Note that when a contention exit regrants a lock with different state or user data information, this change is signalled back from the global manager SLM to the local manager SLM of the holder, and the holding TLM is then informed of the regranted state and user data via its completion exit.

It is not necessary that the locks used by the TLM be uniform in scope. A useful specific instance of this is hierarchical locking. Such locking protocols can significantly reduce the overhead associated with obtaining and releasing locks on specific, very granular resources by attempting to hold locks that are broader in "scope" and which therefore serialize with a single higher-level lock the same set of resources that would require many lower-level locks to serialize. Such protocols can be implemented by using the user data to contain hierarchy information, and using the ability to grant (or regrant) locks with different user data values to negotiate the levels at which locks are held, so as to eliminate the lock state incompatibilities between them.

The following is an overview of an exemplary hierarchical locking protocol. Suppose that 2 levels of lock exist in a given locking hierarchy—a lock of "all records" in a dataset, and a lock of each of the specific "records" in the dataset. Suppose further that any given transaction against this data, when it executes, is likely to update several different records, but that the transaction rate is such that only seldom does more than one transaction try to update any record in the dataset at the same time. In this case, an efficient protocol is to have each TLM obtain the "all records" lock exclusive, update all the records that it needs to, and then release the "all records" lock. This protocol avoids the locking overhead that would be associated with a non-hierarchical lock protocol in which an exclusive lock on each record would have to be obtained before it could be accessed.

In this example, only occasionally will another TLM request the "all records" lock while another TLM holds it, causing contention. When this occurs, the SLM will escalate to global management and drive the contention exit, which will request notification of the lock holder. The holder TLM's notify exit will obtain specific "record" locks on the records that it is using and release the "all records" locks. The contention exit will then modify the current lock request to be for a specific record lock also, and (assuming that specific record lock is not held by the original lock holder), will grant the record level lock to the requestor that caused the contention. Until the contention is eliminated and de-escalation occurs, both TLMs will have to do record-level locking for the records that they are using, and resolve the record-level contention that occurs, but since contention at the data set level was expected to be infrequent, the increased cost of locking when it occurs is more than offset by the decreased cost of locking in the no-contention case.

SLM also allows "waiting" requests—requests which have not been granted or denied as yet—to be superseded by subsequent lock obtain, unlock or alter requests. This gives TLMs the ability to not only direct the resolution of contention for locks which are currently held, but also to make updates to pending lock requests which will be processed in the future so as to remove potential incompatibilities and allow them to be granted.

Figure 22A:
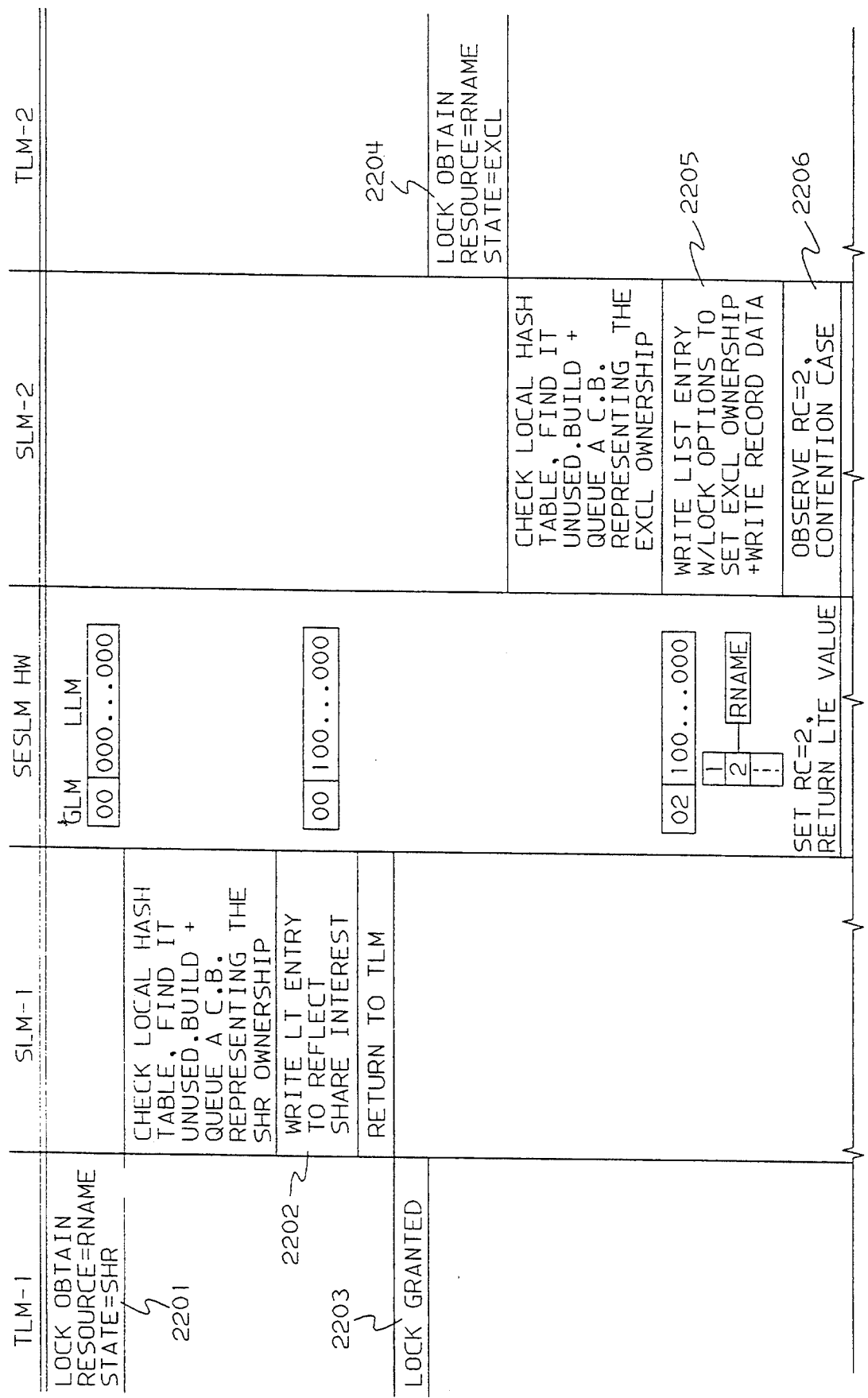
Figures 22, 22C:
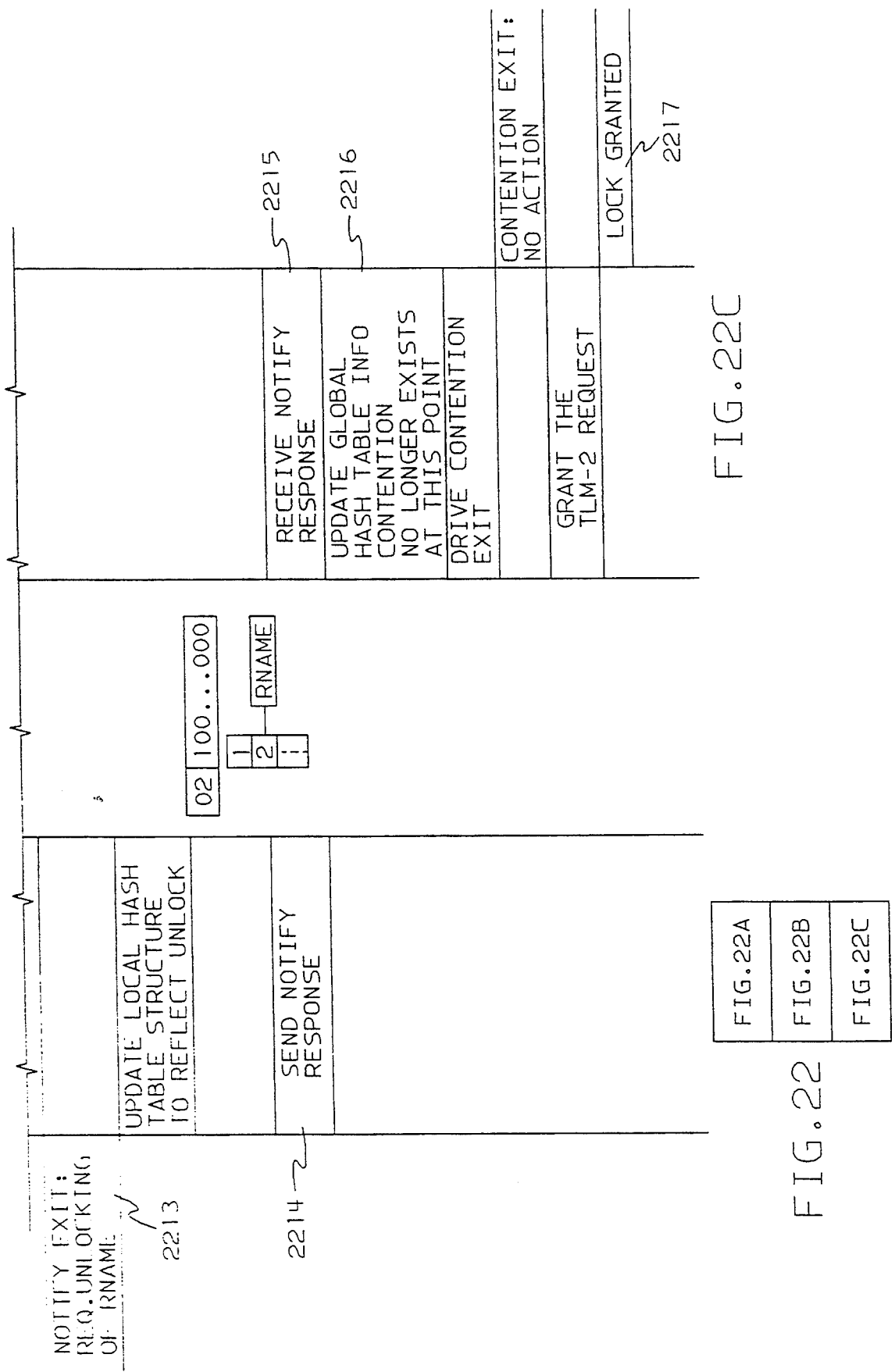

An example of the usage of the contention and notify exits is shown in FIG. 22. In this example, TLM-1 obtains a share lock on resource RNAME. Subsequently, TLM-2 requests RNAME exclusive. Contention is resolved by TLM-1 unlocking RNAME and allowing the exclusive request to proceed. In the diagram, processing by TLM-1 is shown on the far left and processing by TLM-2 is shown on the far right. Time progresses down the diagram. In the following description, references to FIG. 22 are supplemented by references to diagrams earlier in the embodiment which describe SLM processing.

At 2201, TLM-1 issues a share request for resource RNAME. The SESLM lock table is updated to show share interest (2202 and FIG. 4 at 402) and the lock request is granted to TLM-1 (2203 and FIG. 4 at 404).

At 2204, TLM-2 issues an exclusive request for RNAME. The exclusive request is presented to the SESLM and contention is observed (2206 and FIG. 4 at 407). Escalation processing is initiated (2207 and FIG. 4 at 408) by sending signals to all interested SLMs. In this case, SLM-1 is signalled.

At 2208 (and FIG. 6 at 601), SLM-1 gathers information for the hash class and responds to SLM-2. SLM-2 receives the message from SLM-1 at 2209 (and FIG. 5 at 506). The contention exit of TLM-2 is given control at 2210 (and FIG. 5 at 513), and elects to have the notify exit of TLM-1 driven 2211 (FIG. 8 at 801).

Figure 9:
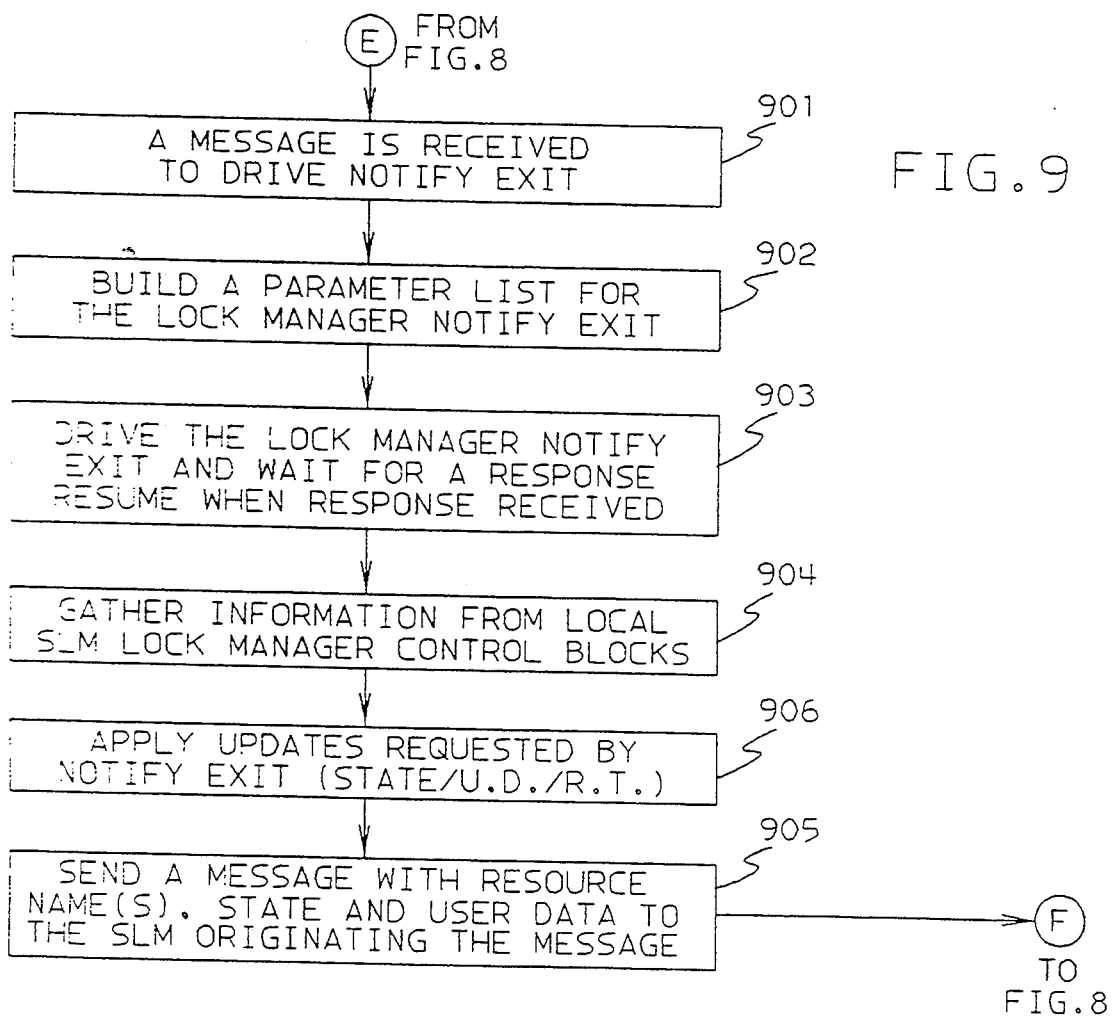
FIG. 9 is a flowchart showing control flow for the SLM escalation notify exit.

At 2212, SLM-1 receives the message from SLM-2 and drives the notify exit of TLM-1 (FIG. 9 at 903). TLM-1 requests RNAME to be unlocked in the notify exit (2213). A response is sent to SLM-2 (2214 and FIG. 9 at 905).

When SLM-2 receives a response from SLM-1 regarding the notify exit processing for TLM-1 (2215), the contention exit is driven again (FIG. 5 at 512) showing the updated TLM-1 status and TLM-2 request for exclusive state (2216). At this point, the contention exit of TLM-2 grants the exclusive request (2217 and FIG. 7 at 703) and processing is completed.

Taken together, these features of the SLM contention management structure allow the TLMs to implement a broad range of flexible and efficient locking protocols to suit their needs.

TLM/SLM Recovery (Failure Recognition and Notification of Surviving TLM's)

Overview: When an instance of the software locking service (e.g., the SLM/TLM pair) fails, the requirement is to preserve the integrity of the data elements associated with data base managers utilizing the locking service. In meeting this requirement, there are several goals which must be observed. As a first goal, the impact of the failure must be limited in such a way as to insure that all data base records for which there was no modify intent represented by the failed service continue to be available to other work elements in the sysplex. In support of this goal, the locking services which continue to execute correctly require the ability to quickly determine the potential set of modify locks. This goal is supported by the record data contained in the SESLM structure (FIG. 2 at 1806).

Figure 17:
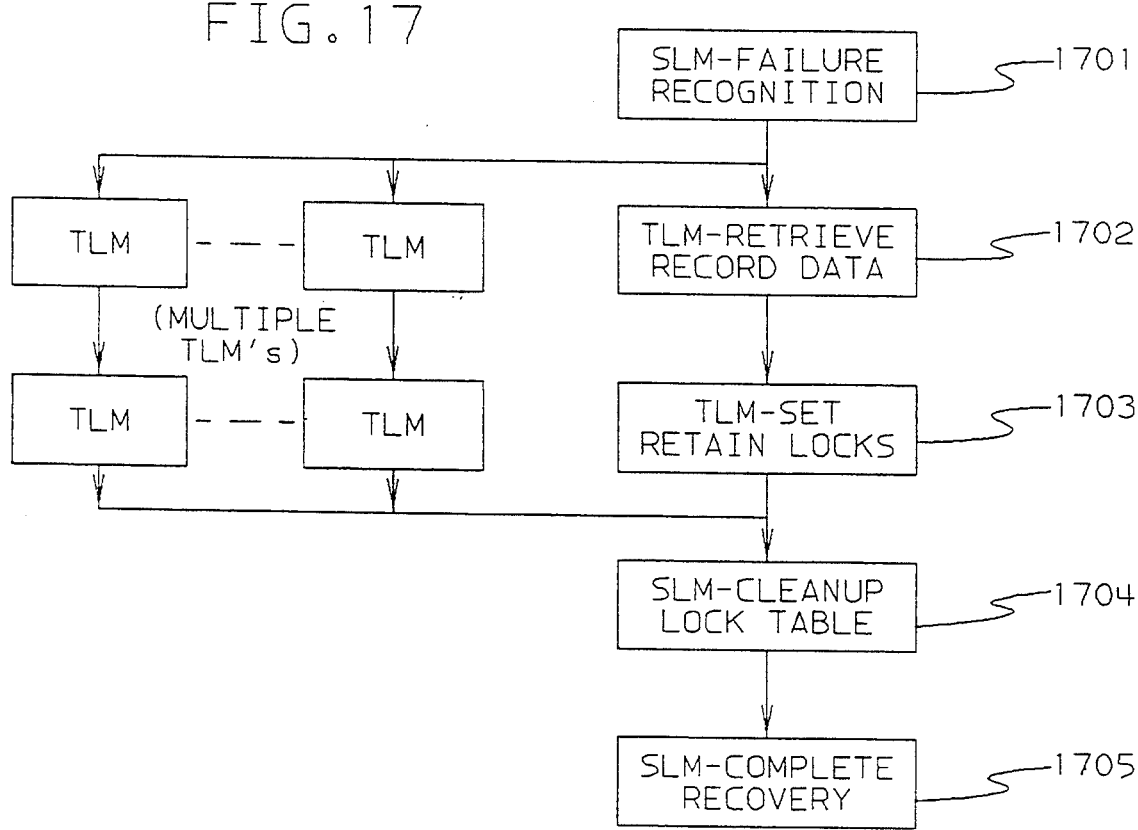
FIG. 17 is a flowchart showing control flow for Lock Management Recovery processing.
Figure 20:
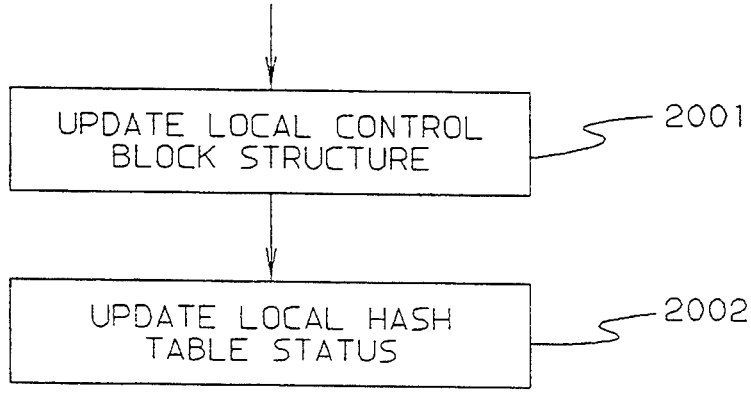
FIG. 20 is a flowchart showing SLM De-escalation processing control flow.

Process: FIG. 17 illustrates the flow of control following a failure of an instance of the software locking service.

Failure recognition (1701)—In general, recognition of a TLM/SLM failure is achieved conventionally by operating system services (such as MVS's End of Task/End of Memory (EOT/EOM) Resource Manager used by SLM. These operating system services include detection of termination of work elements which execute within the operating system environment and detection of termination of an instance of an operating system within the sysplex. Support is provided by SLM which will receive control from the operating system following the termination of a work element which was utilizing SLM services. This SLM support may receive control on: the same operating system as that on which a work element terminated; another operating system image within the sysplex following an operating system failure; the first occurrence of an operating system image in the sysplex. The SLM support will record the failure of a TLM/SLM pair for subsequent reporting to other interested instances of the locking service. Other instances of the locking service which utilize the same SESLM structure (by definition of sharing group with predefined name, as explained above under "SLM Functions") will be given notification of a failure at one of two times: If other instances of the locking service are actively executing, notification will be provided following the failure and after no subsequent changes to the SESLM structure can be effected by the failed TLM/SLM; other instances of the locking service will be notified of failed TLM/SLM instances as part of the SLM initialization function. When notified of a failed TLM/SLM instance, the associated UID is provided.

When notification of a failed TLM/SLM instance is provided to active TLM/SLMs, each performs the steps of retrieving record data (1702) and set retain locks (1703). The processing associated with retrieving record data and set retain locks described in the following two paragraphs execute in parallel on all TLM/SLMs notified.

Retrieve record data (1702)—SLM services enable an active TLM/SLM instance to retrieve the record data associated with a specified UID. The SLM service utilizes the Reading List command (as explained above) to retrieve the record data from the SES List Structure. The list specified corresponds to the UID associated with the failed TLM/SLM.

Set retain locks (1703)—The TLM uses the record data to build a control structure which represents retain locks on the data elements protected by the locks reflected in the record data. A retain lock has the special attribute that any request for that lock is rejected with an indication that the associated data is not available. This control structure is built and managed by the TLM. The TLM maintains a local lock structure (FIG. 2 at 15G and 15H). Each TLM instance builds retained lock entries in its local lock structure. When processing a lock request, the TLM checks its local lock structure to determine if there is a retained lock for the specified resource.

In addition to the retained locks, the TLM's local lock structure contains entries for currently held locks that were granted by this TLM instance and entries for lock requests processed by this TLM that are currently waiting.

Lock table cleanup (1704)—When all active instances of the locking service have set retained locks, the lock table will be updated by the SLM. The data base resources represented by the lock table in the SESLM, are protected by the control structure in the active TLM instances. Since, through the hashing function, many lock names map to a lock table entry in the SESLM, the lock table entries used for retained locks must be updated in order to not delay granting of other locks which map to those lock table entries. Any share locks held by the failed TLM/SLM instance can be released. Any lock table entries held in an exclusive state only by the failed TLM/SLM instance can be released. Any lock table entries held in an exclusive state for global management purposes by the failed TLM/SLM instance must be reassigned global management responsibility to a correctly executing TLM/SLM instance. The SLM utilizes the Read Next Non-Zero Lock Table Entry command supported by the SESLM to locate lock table entries which require cleanup.

The SLM uses the Clear Lock Table command to clear all entries in the lock table when all TLM's have failed and require cleanup. This cleanup takes place when the first system IPL's into the Sysplex.

Recovery completion (1705)—Recovery for the data base records is performed by the data base manager. Records recorded on the data base manager log are processed against the data base. When data base recovery has been completed, the data base manager informs the associated TLM/SLM. The TLM utilizes SLM provided services to indicate completion of recovery and to request all record data for the failed TLM be deleted from the SESLM.

The record data entries can also be "reacquired" by recovering TLM's on subsequent lock obtain requests that they issue. In these cases, the record data entry is not deleted; rather, its association is changed to reflect ownership by the TLM which reacquired the lock.

What is claimed is:

1. A locking apparatus for managing access to shared data by a plurality of transactions, said access to said shared data controlled by two or more data managers executing in a processing complex comprising one or more processors, said shared data comprising shared resources, each of said processors coupled to all others of said processors and to said shared data, said apparatus comprising:

a) a plurality of lock managers (LM's) each executing on one of said processors, each of the LM's responsive to a serialization request, by an associated one of said two or more data managers, to serialize an access attempt for one of said shared resources, each of said LM's comprising:

i) a tailored lock manager (TLM) means for formulating a locking request for said shared resource in response to said serialization request;

ii) a system lock manager (SLM) means for providing local and first global locking services, responsive to said locking request, said SLM means comprising local status indication means and distributed contention resolution means, said local status indication means comprising: a local hash table means for indicating lock ownership state so that said locking request can be granted without communication with others of said one or more processors, or with a structured external storage facility, if said one of said shared resources is indicated as being owned in said requested state; said distributed contention resolution means comprising a global table means;

b) a structured external storage facility (SES) connected to each SLM, said SES comprising a SES lock manager (SESLM) means for providing second global locking services when required for said locking request, said SESLM means comprising global lock table means for global indication of lock ownership state of said shared resource, and further comprising list means for recording modify information for recovering portions of said shared data.

2. The apparatus of claim 1 in which said local hash table means comprises a hash table having one or more entries, each of said entries having a null value to indicate that no associated locks are locally held, and having a pointer value, linking said each of said entries to a queue of one or more lock names associated with locally held locks.

3. The apparatus of claim 1 in which said global table means comprises a hash table having one or more entries, each of said entries having a null value to indicate that no associated locks are globally held, and having a pointer value, linking said each of said entries to a queue of one or more lock names associated with globally held locks.

4. The apparatus of claim 1 in which said TLM means further comprises contention means for managing lock request contention according to a lock compatibility matrix.

5. The apparatus of claim 4 in which said contention means comprises a contention exit for determining a necessary action according to said compatability matrix, and a notify exit for performing said necessary action.

6. The apparatus of claim 5 in which said necessary action is an unlock action.

7. The apparatus of claim 1 in which said locking request is granted by said SESLM, without communication with others of said one or more processors than a requesting one of said processors, when said global lock table means indicates that no contention exists for said one of said shared resources.

8. The apparatus of claim 7 in which said global lock table means comprises one or more global lock table (GLT) entries, each of said GLT entries comprising a global lock manager (GLM) portion and a local lock manager (LLM) portion, said GLM portion indicating whether an associated lock is globally owned by an associated global owning user, said LLM portion indication whether the associated lock is locally owned by one or more associated local owning users.

9. The apparatus of claim 7 in which said list means comprises a list set comprising one or more lists, each of said one or more lists located by an associated user ID (UID) and containing a null value if no associated exclusive locks are held, or containing a pointer value linking said pointer value to a queue of one or more modify lock names, each of said one or more modify lock name identifying associated exclusively held locks.

10. A method for locking data distributed in a processing complex, said processing complex comprising: shared data comprising shared resources; one or more processors coupled to all others of said processors and to said shared data: and two or more data managers each controlling access to said shared data for one or more transactions; said method comprising the steps of:
   a) one of said data managers issuing a lock request for a shared resource having a shared resource name, triggered by a request by a requesting transaction for said shared data, and transmitting said lock request to a tailored lock manager (TLM), said lock request comprising a requested ownership state and said shared resource name;
   b) said TLM using a hashing algorithm to convert said lock request to a request to lock a hash table entry, and transmitting a converted lock request to a system lock manager (SLM);
   c) said SLM checking said converted lock request against an entry in a local hash table in a local one of said one or more processors for local ownership of said entry with said requested ownership state;
   d) if said step of checking indicated local ownership with said requested ownership state, setting an indication of said requested ownership state of said shared resource and granting said lock request;
   e) if said step of checking did not indicate local ownership with said requested ownership state, communicating a message comprising said lock request to a central coupling facility, said central coupling facility responding to said message by:
      i) indicating that said lock request may be granted if a control structure in said central coupling facility so indicates;
      ii) indicating that lock contention exists if said control structure in said central coupling facility so indicates.

11. The method of claim 10 in which said setting of said indication of ownership comprises the step of chaining a control block comprising said shared resource name to said entry in said local hash table, if said requested ownership state is exclusive access.

12. The method of claim 10 in which said step of indicating that said lock request may be granted further comprises the step of chaining a control block comprising said shared resource name to said control structure in said central coupling facility if said requested ownership state is exclusive access.

13. The method of claim 10 in which, when said central coupling facility responds to said message by indicating that lock contention exists, a lock escalation process is performed in response, said lock escalation process comprising the steps of:
   a) sending a signal to a targeted SLM requesting global management of said shared resource;
   b) said targeted SLM obtaining resource information from one or more other SLM instances, and evaluating said resource information to determine if said lock request can be granted.

14. The method of claim 13 in which said message further comprises an indication of whether said requesting transaction will be suspended, or will establish a completion exit, if said lock contention exists.

15. A method of recovering from a failure involving a first lock manager function associated with a first data manager function in a processing complex, said processing complex comprising: shared data comprising shared resources; one or more processors coupled to all others of said processors and to said shared data; and two or more data managers, belonging to a sharing group, each controlling access to said shared data for one or more transactions; said method comprising the steps of:
   a) storing record data comprising a first resource name for a first resource owned exclusively by said first lock manger in a control structure in a central coupling facility before said failure;
   b) detecting said failure;
   c) notifying a second lock manager function, belonging to said sharing group, of said failure;
   d) said second lock manager function retrieving said stored record data from said central coupling facility and indicating the setting of a local RETAIN lock for said first resource;
   e) indicating release of ownership of said first resource, by said first lock manager, in said control structure.

16. A locking apparatus for managing access to shared data by a plurality of transactions said access to said shared data controlled by two or more data managers executing in a processing complex comprising one or more processors, said shared data comprising shared resources, each of said processors coupled to all others of said processors and to said shared data, said apparatus comprising:
   a) a plurality of lock managers (LM's) each executing on one of said processors, each of the LM's responsive to a serialization request, by an associated one of said two or more data managers, to serialize an access attempt for one of said shared resources, each of said LM's comprising:
      i) a tailored lock manager (TLM) means for formulating a locking request for said shared resource in response to said serialization request;
      ii) a system lock manager (SLM) means for providing local and first global locking services, responsive to said locking request, said SLM comprising local hash table means for local indication of status for said shared resource, and global table means for distributed contention resolution;

b) a structured external storage facility (SES) connected to each SLM, said SES comprising a SES lock manager (SESLM) means for providing second global locking services, said SESLM means comprising global lock table means for global indication of status of said shared resource, and further comprising list means for recording modify information for recovering portions of said shared data;

c) a wait indicator having a first value if said associated one of said two or more data managers will wait for delayed completion of said serialization request, and having a second value if said associated one of said two or more data managers will not wait for delayed completion of said serialization request;

d) means for asynchronous notification of delayed completion of said serialization request if said wait indicator has said second value.

17. The apparatus of claim 16 in which said means for asynchronous notification of delayed completion comprises a completion exit, said completion exit being activated at completion of said serialization request, and being passed a completion status indicator.

* * * * *